US010955082B2

(12) United States Patent
Genta

(10) Patent No.: US 10,955,082 B2
(45) Date of Patent: Mar. 23, 2021

(54) AUTOMATED PIPELINE PIG HANDLING SYSTEM

(71) Applicant: Saudi Arabian Oil Company, Dhahran (SA)

(72) Inventor: Pablo Daniel Genta, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 95 days.

(21) Appl. No.: 16/440,142

(22) Filed: Jun. 13, 2019

(65) Prior Publication Data

US 2019/0293226 A1 Sep. 26, 2019

Related U.S. Application Data

(62) Division of application No. 15/280,079, filed on Sep. 29, 2016, now Pat. No. 10,364,930.

(Continued)

(51) Int. Cl.

*B25J 9/16* (2006.01)
*F16L 55/46* (2006.01)

(Continued)

(52) U.S. Cl.

CPC ............ *F16L 55/46* (2013.01); *B08B 9/0551* (2013.01); *B25J 9/162* (2013.01); *B66F 7/065* (2013.01);

(Continued)

(58) Field of Classification Search

CPC .. B25J 9/162; B25J 9/0093; B25J 9/02; F16L 55/46; B08B 9/0051; B66F 7/065; B65G 2201/0291

See application file for complete search history.

(56) References Cited

U.S. PATENT DOCUMENTS

| | | | |
|---|---|---|---|
| 2,493,504 | A | 1/1950 | Roberts |
| 3,265,083 | A | 8/1966 | Sachnik |

(Continued)

FOREIGN PATENT DOCUMENTS

| | | |
|---|---|---|
| WO | 2010/036932 | 4/2010 |
| WO | 2015/134482 | 9/2015 |

OTHER PUBLICATIONS

Gulf Cooperation Council Examination Report issued in GCC Application No. GC 2016-32114 dated Mar. 24, 2019, 4 pages.

(Continued)

*Primary Examiner* — Jason Holloway

(74) *Attorney, Agent, or Firm* — Fish & Richardson P.C.

(57) ABSTRACT

Certain aspects of the subject matter described here can be implemented as a method. A location of an entrance to a pipeline pig launcher configured to launch a pipeline pig into a pipeline is determined by an automated pipeline pig handling system positioned at a starting location. The pipeline pig is self-aligned with the entrance to the pipeline pig launcher by the automated pipeline pig handling system. The entrance to the pipeline pig launcher is open. The pipeline pig is inserted by the automated pipeline pig handling system into the entrance to the pipeline pig launcher. The entrance to the pipeline pig launcher is closed by the automated pipeline pig handling system after the pipeline pig is inserted into the entrance. The automated pipeline pig handling system is self-returned to the starting location after inserting the pipeline pig into the entrance to the pipeline pig launcher.

11 Claims, 17 Drawing Sheets

Related U.S. Application Data

(60) Provisional application No. 62/234,153, filed on Sep. 29, 2015.

(51) Int. Cl.

| | |
|---|---|
| ***B08B 9/055*** | (2006.01) |
| ***B66F 7/06*** | (2006.01) |
| *B25J 9/02* | (2006.01) |
| *B25J 9/00* | (2006.01) |

(52) U.S. Cl.

CPC ................ *B25J 9/0093* (2013.01); *B25J 9/02* (2013.01); *B65G 2201/0291* (2013.01)

(56) References Cited

U.S. PATENT DOCUMENTS

| | | | | |
|---|---|---|---|---|
| 4,435,872 | A | | 3/1984 | Leikam |
| 4,906,136 | A | | 3/1990 | Norbom |
| 5,044,827 | A | | 9/1991 | Gray |
| 5,139,576 | A | | 8/1992 | Davis |
| 5,186,757 | A | | 2/1993 | Abney, Sr. |
| 5,430,643 | A | | 7/1995 | Seraji |
| 5,769,955 | A | | 6/1998 | Kozisek |
| 6,234,717 | B1 | | 5/2001 | Corbetta |
| 6,475,294 | B2 | | 11/2002 | McCanna et al. |
| 8,397,670 | B2 | | 3/2013 | Van Der Berg |
| 8,800,584 | B2 | | 8/2014 | McNabney et al. |
| 2003/0154769 | A1 | | 8/2003 | Tucker |
| 2004/0074030 | A1 | | 4/2004 | Nehrbass |
| 2004/0158355 | A1 | | 8/2004 | Holmqvist et al. |
| 2007/0177944 | A1 | | 8/2007 | Smith |
| 2008/0072963 | A1 | | 3/2008 | Strohmeier et al. |
| 2009/0152520 | A1 | | 6/2009 | Hepburn |
| 2010/0104401 | A1 | | 4/2010 | Hopkins |
| 2011/0106362 | A1 | | 5/2011 | Seitz |
| 2012/0193154 | A1 | | 8/2012 | Wellborn et al. |
| 2016/0169436 | A1 | | 6/2016 | Sander |
| 2016/0340161 | A1 | * | 11/2016 | Olivier .................. B66F 7/0625 |
| 2016/0369934 | A1 | | 12/2016 | Penza |

OTHER PUBLICATIONS

Gulf Cooperation Council Examination Report issued in GCC Application No. GC 2016-37926 dated Feb. 25, 2020, 3 pages.

International Search Report and Written Opinion of the International Searching Authority issued in International Application No. PCT/US2016/054330 dated Jan. 3, 2017; 13 pages.

Gulf Cooperation Council Examination Report issued in GCC Application No. GC 2016-32114 dated Nov. 13, 2018, 5 pages.

GCC Examination Report issued in Gulf Cooperation Council Application No. GC 2016-37926 dated Aug. 8, 2020, 3 pages.

* cited by examiner

AUTOMATED PIPELINE PIG HANDLING SYSTEM

CROSS-REFERENCE TO RELATED APPLICATIONS

This application is a divisional of, and claims priority to U.S. patent application Ser. No. 15/280,079, filed on Sep. 29, 2016; which in turn claims the benefit of U.S. Provisional Patent Application No. 62/234,153, filed on Sep. 29, 2015; the entire contents of which are incorporated by reference herein.

TECHNICAL FIELD

This specification relates to pipelines, for example, pipelines for transmitting fluid such as hydrocarbons.

BACKGROUND

Pipelines that carry fluids, for example, petroleum, natural gas, multi-phase fluids or other fluids, are internally inspected or cleaned by inserting a pig into the pipeline at a first point. The fluids flowing through the pipeline push the pig through the pipeline to a second point where the pig is caught and removed from the pipeline. A pipeline pig can be any structure or device that can move through a pipeline to perform a function. In one example, a pipeline pig can be implemented as a pipeline scraper to clean an interior of the pipeline. In another example, a pipeline pig can be implemented to swab, i.e., remove liquids or gases, from the pipeline. In a further example, a pipeline pig can be implemented to batch, i.e., separate different fluids in the pipeline. In additional examples, pipeline pigs can be implemented to perform intelligent operations such as monitoring and conveying information about a particular condition or performance of the pipeline.

Pipeline pigs can be launched into pipelines by providing launch stations or catcher stations (or both) at multiple points along the pipeline at which a pipeline pig will be inserted or removed (or both). The insertion and retrieval of pipeline pigs can be performed manually (for example, with human operators) or with partial assistance for example, using electromechanical lifting, pushing and retrieving devices. Such devices perform high-level operations such as pig lifting, pushing, pulling or combinations of them while human operators perform finer operations such as positioning the pig for either launching or receiving.

SUMMARY

This specification describes technologies relating to a pipeline pig handling system.

Certain aspects of the subject matter described here can be implemented as a method. A location of an entrance to a pipeline pig launcher configured to launch a pipeline pig into a pipeline is determined by an automated pipeline pig handling system positioned at a starting location. The pipeline pig is self-aligned with the entrance to the pipeline pig launcher by the automated pipeline pig handling system. The entrance to the pipeline pig launcher is open. The pipeline pig is inserted by the automated pipeline pig handling system into the entrance to the pipeline pig launcher. The entrance to the pipeline pig launcher is closed by the automated pipeline pig handling system after the pipeline pig is inserted into the entrance. The automated pipeline pig handling system is self-returned by the automated pipeline pig handling system to the starting location after inserting the pipeline pig into the entrance to the pipeline pig launcher.

The automated pipeline pig handling system includes an outer body and an articulated arm attached to the outer body, the articulated arm configured to connect to the pipeline pig. The automated pipeline pig handling system operates the articulated arm to lift the pipeline pig, and the automated pipeline pig handling system operates the articulated arm to place the pipeline pig on the outer body. The automated pipeline handling system includes a transportation assembly attached to the outer body, the transportation assembly configured to receive the pipeline pig and to move the pipeline pig to one or multiple locations on the transportation assembly, multiple sensors, at least one of the sensors attached to the outer body, the multiple sensors configured to sense parameters associated with a location of the outer body relative to the pipeline pig launcher, and a controller including processing circuitry, the controller connected to the articulated arm, the transportation assembly and the sensors, the controller configured to perform pipeline pig launching or retrieval operations by controlling the articulated arm and the transportation assembly based on the parameters sensed by the sensors. Operating the articulated arm to lift the pipeline pig and operating the articulated arm to place the pipeline pig on the outer body includes receiving, by the automated pipeline pig handling system, first sensor information from multiple sensors, the first sensor information identifying the starting location of the pipeline pig relative to the location of the outer body, adjusting, by the automated pipeline pig handling system, a position of the articulated arm to attach to the pipeline pig based on identifying the starting location of the pipeline pig relative to the location of the outer body, moving, by the automated pipeline pig handling system, the articulated arm to the starting location of the pipeline pig, and attaching, by the automated pipeline pig handling system, the articulated arm to the pipeline pig.

The entrance to the pipeline pig has a first longitudinal axis. The outer body has a second longitudinal axis. Self-aligning the pipeline pig with the entrance to the pipeline pig launcher includes self-aligning the second longitudinal axis with the first longitudinal axis. Self-aligning the second longitudinal axis with the first longitudinal axis includes receiving, by the automated pipeline pig handling system, second sensor information from multiple sensors, the second sensor information identifying a location of the first longitudinal axis of the entrance to the pipeline pig launcher relative to a location of the second longitudinal axis of the outer body, and operating, by the automated pipeline pig handling system, the transportation assembly to move the outer body and align the second longitudinal axis with the first longitudinal axis. The automated pipeline pig handling system includes at least one of a scissors lift or outriggers, wherein self-aligning the second longitudinal axis with the first longitudinal axis includes operating, by the automated pipeline pig handling system, the scissors lift or the outriggers to increase an elevation of the pipeline pig from a ground and to align the second longitudinal axis with the first longitudinal axis.

The articulated arm is extendable from a retracted state to an extended state. Inserting, by the automated pipeline pig handling system, the pipeline pig into the entrance to the pipeline pig launcher includes operating, by the automated pipeline pig handling system, to extend the articulated arm to which the pipeline pig is attached from the retracted state to the extended state, wherein, in the extended state, the articulated arm extends into the entrance to the pipeline pig launcher. The articulated arm includes a telescoping piston. Inserting, by the automated pipeline pig handling system, the pipeline pig into the entrance to the pipeline pig launcher includes operating, by the automated pipeline pig handling system, the articulated arm to which the pipeline pig is attached to extend the telescoping piston. An extended telescoping piston extends into the entrance to the pipeline pig launcher.

Certain aspects of the subject matter described here can be implemented as an automated pig handling system. The automated pig handling system includes an outer body, an articulated arm attached to the outer body, the articulated arm configured to connect to a pipeline pig, a transportation assembly attached to the outer body, the transportation assembly configured to receive the pipeline pig and to move the pipeline pig to one or more locations on the transportation assembly, multiple sensors, at least one of the sensors attached to the outer body, the sensors configured to sense parameters associated with a location of the outer body relative to a pig trap door, and a controller including processing circuitry, the controller connected to the articulated arm, the transportation assembly and the sensors. The controller is configured to perform pipeline pig launching or retrieval operations by controlling the articulated arm and the transportation assembly based on the parameters sensed by the sensors.

The articulated arm is attached to the outer body on a rotatable base. The controller is configured to control the articulated arm to rotate about the base. The controller is configured to control the articulated arm to transition between a fully retracted state and a fully extended state. The articulated arm includes multiple joints. The controller is configured to control a swiveling of the articulated arm about each of the joints. The articulated arm includes a telescoping piston. The controller is configured to control the telescoping piston between an extended position and a retracted position. The transportation assembly includes a conveyer belt. The controller is configured to control a movement of the conveyer belt. The transportation assembly includes a sliding tray. The controller is configured to extend the sliding tray between a location on the outer body to a location extending beyond the outer body.

Certain aspects of the subject matter described here can be implemented as a method. A location of an entrance to a pipeline pig trap configured to receive a pipeline pig from a pipeline is determined by an automated pipeline pig handling system positioned at a starting location. The entrance to the pipeline pig trap is open. The automated pipeline pig handling system the pipeline pig is self-aligned with the entrance to the pipeline pig trap. The pipeline pig is removed by the automated pipeline pig handling system out of the entrance to the pipeline pig trap. The entrance to the pipeline pig trap is closed after the pipeline pig is removed out of the entrance by the automated pipeline pig handling system. The automated pipeline pig handling system is self-returned to the starting location after removing the pipeline pig from the entrance to the pipeline pig trap.

The automated pipeline pig handling system includes an outer body and an articulated arm attached to the outer body; the articulated arm is configured to connect to the pipeline pig. The articulated arm is operated by the automated pipeline pig handling system to lift the pipeline pig. The articulated arm is operated, by the automated pipeline pig handling system to place the pipeline pig on the outer body. The automated pipeline handling system includes a transportation assembly attached to the outer body, the transportation assembly configured to receive the pipeline pig and to move the pipeline pig to one or more locations on the transportation assembly, multiple sensors, at least one of the sensors attached to the outer body, the sensors configured to sense parameters associated with a location of the outer body relative to the pipeline pig launcher; and a controller that includes processing circuitry. The controller is connected to the articulated arm, the transportation assembly, and the sensors. The controller is configured to perform pipeline pig launching or retrieval operations by controlling the articulated arm and the transportation assembly based on the parameters sensed by the sensors. Operating the articulated arm to lift the pipeline pig and operating the articulated arm to place the pipeline pig on the outer includes receiving, by the automated pipeline pig handling system, first sensor information from the sensors, the first sensor information identifying the starting location of the pipeline pig relative to the location of the outer body, adjusting, by the automated pipeline pig handling system, a position of the articulated arm to attach to the pipeline pig based on identifying a starting location of the pipeline pig relative to the location of the outer body, moving, by the automated pipeline pig handling system, the articulated arm to the starting location of the pipeline pig, and attaching, by the automated pipeline pig handling system, the articulated arm to the pipeline pig.

The articulated arm is retractable from an extended state to a retracted state. Removing, by the automated pipeline pig handling system, the pipeline pig from the entrance to the pipeline pig trap includes operating, by the automated pipeline pig handling system, to retract the articulated arm to which the pipeline pig is attached from the extended state to the retracted state, wherein, in the retracted state, the articulated arm retracts out of the entrance to the pipeline pig trap. The articulated arm includes a telescoping piston, and wherein removing, by the automated pipeline pig handling system, the pipeline pig out of the entrance to the pipeline pig trap includes operating, by the automated pipeline pig handling system, the articulated arm to which the pipeline pig is attached to retract the telescoping piston, wherein a retracted telescoping piston retracts out of the entrance to the pipeline pig trap.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to pipeline pig handling apparatuses and systems. In some implementations, a pipeline pig handling system can be implemented as an automated pig launching and retrieving system which includes a portable, unmanned, ground and self-propelled vehicle. Such a vehicle can insert a pipeline pig into or retrieve a pipeline pig from a pig trap. The vehicle can include a controller operatively coupled to the vehicle to execute instructions to perform pipeline pig launching and receiving operations. The system can be transported to a location of a pipeline using a truck or another suitable carrying vehicle.

Figure 1:
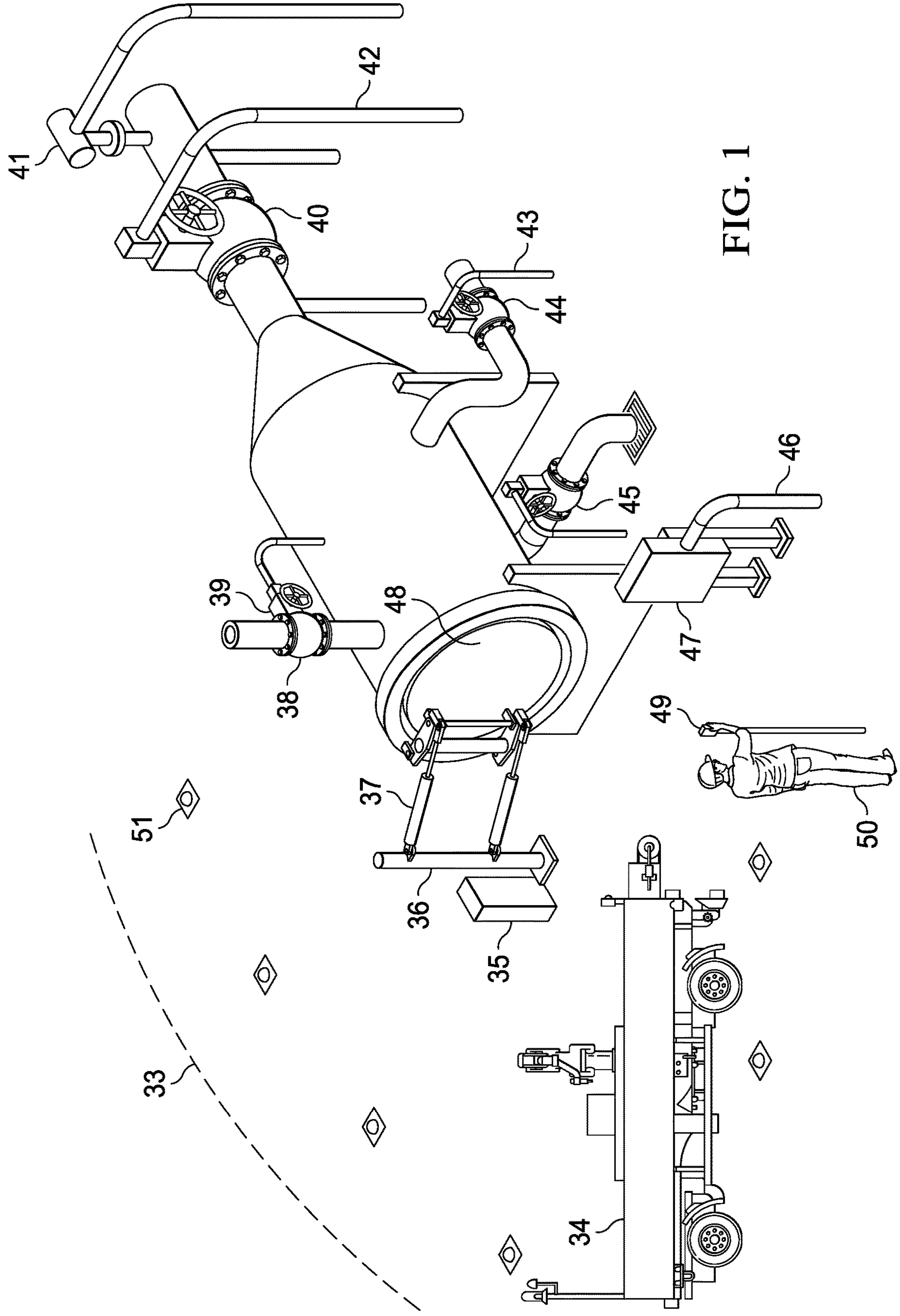
FIG. 1 is a schematic diagram showing an example of an automatic pipeline pig handling system configured to load a pipeline pig into a pipeline.

FIG. 1 is a schematic diagram showing an example of an automatic pipeline pig handling system 34 configured to load a pipeline pig (not shown) into a pipeline. The automatic pipeline pig handling system 34 can be implemented as an unmanned and self-propelled ground vehicle (USPGV). In some implementations, the system 34 can be placed at a location near a pig trap. The pig trap can include a trap door 48, a door opener support pole 36, an electro-hydraulic unit 35, and a local ground controller 47. The trap door 48 can be opened to insert the pipeline pig into the pipeline. The local ground controller 47 can be connected to a command and power wiring conduit 46 through which wires can be passed to connect the controller 47 to multiple position switches (for example, a first position switch 39, a second position switch 42, a third position switch 43, or more or fewer position switches). The wires can also connect the controller 47 to multiple command-associated valves (for example, a first valve 38, a second valve 40, a third valve 44, a fourth valve 45, or more or fewer valves).

In some implementations, the controller 47 is connected to the on-board USPGV controller 21A (FIG. 4A), for example, via a wireless link, to facilitate the mobility of the USPGV within the pig launching or receiving facilities. The controller 47 transmits the status signals of the pig trap and valves connected to it to allow the USPGV to commence pig launching or receiving operations. The controller 47 is also connected to a pressure sensor/transmitter 41, which, in turn, is connected to the pipeline. The pressure sensor/transmitter 41 can sense a pressure in the pipeline and transmit the pressure, for example, as a current or voltage signal, to the controller 47. The controller 47 can access a storage medium (for example, a computer-readable storage medium) that stores multiple specified values and mathematical functions associated with threshold pressures in the pipeline. The controller 47 can compare the pressure sensed by and received from the pressure sensor/transmitter 41 with one or more threshold pressures to determine at least one of if the pig operation can be initiated safely, if the operation must be stopped in place or if the operation must be aborted.

Figure 2A:
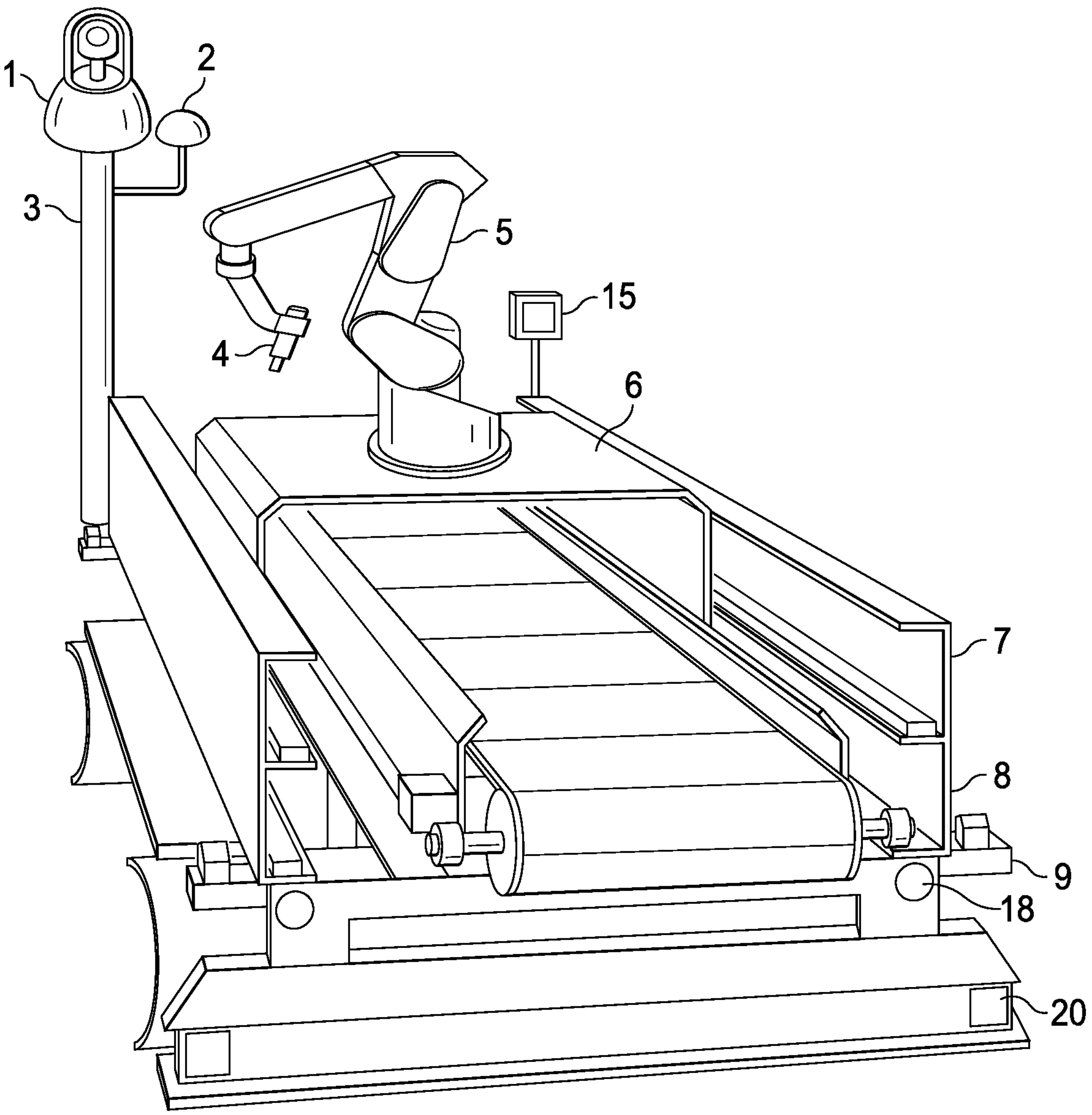
FIGS. 2A-2C are schematic diagrams of an example of an automatic pipeline pig handling system.

In some implementations, the system 34 automatically and without user intervention transports a pipeline pig from a location at which the pig is positioned or stored to the pig trap and inserts the pig trap into the trap door 48. To do so, in some implementations, the system 34 can traverse a ground path 33 along which multiple path transmitters 51 can be disposed. In some other implementation, the system 34, through the onboard controller 21A, identifies its current location by utilizing a GPS antenna 2 (FIG. 2A). To do so, the system 34 can implement a self-location function utilizing the location information received by the GPS antenna 2, which sends geographical and time coordinate signals to the USPGV controller 21A. The controller 21A stores, for example, in a non-volatile memory, the preselected trajectory of the USPGV from a departure point to a destination pre-selected by the user.

In some implementations, the system 34 can travel from a first location (for example, a gated fence in the pig facility or other location) to a second location (for example, the trap door 48) by following a trajectory defined by path transmitters 51. A path transmitter 51 can be a wireless identifiable ground transmitter that can send a coded signal uniquely associated to its geographical location. In one example, the path transmitters 51 are passive (no power required) RFID transmitters capable of responding to a RFID reader module located inside the USPGV controller 21A. In another example, the path transmitters 51 are actively powered by built-in power sources and are capable of transmitting a beacon wireless signal to the receiver located inside the USPGV controller 21A. In another example, visual tags can be used; the visual tags can be identified by cameras or similar optical sensors on the USPGV. When path transmitters 51 are used, the system 34 can follow a pre-established trajectory defined by the path transmitters 51 along the ground path 33 to the pig trap. In some instances, the system 34 can follow the same ground path 33 back to an initial position. The path can be a trajectory starting at the gated fence of the pig facility and ending a certain distance (for example, 1.5 meters) from the pig trap door 48. In one example, the ground path covers the distance which extends from the USPGV's permanent storage place, for example, a warehouse, to the pig operation facility. In another example, the ground path starts at the entry gate of the pig handling facility, either launching or receiving, and ends at a safety distance predetermined by the user and measured from the pig trap door 48. Upon reaching the trap door 48, the system can automatically and without user intervention self-align to the trap door. Such self-aligning can be implemented to both launch the pipeline pig into the pipeline and to retrieve the pig from the pipeline.

In some implementations, the automated pipeline pig handling system described here can self-perform all operations described here using one or more onboard controllers connected to one or more onboard or off-board sensors. Alternatively, the system can be controlled by a human operator 50 using a controller 49 operatively coupled to the onboard controller.

Figure 2B:
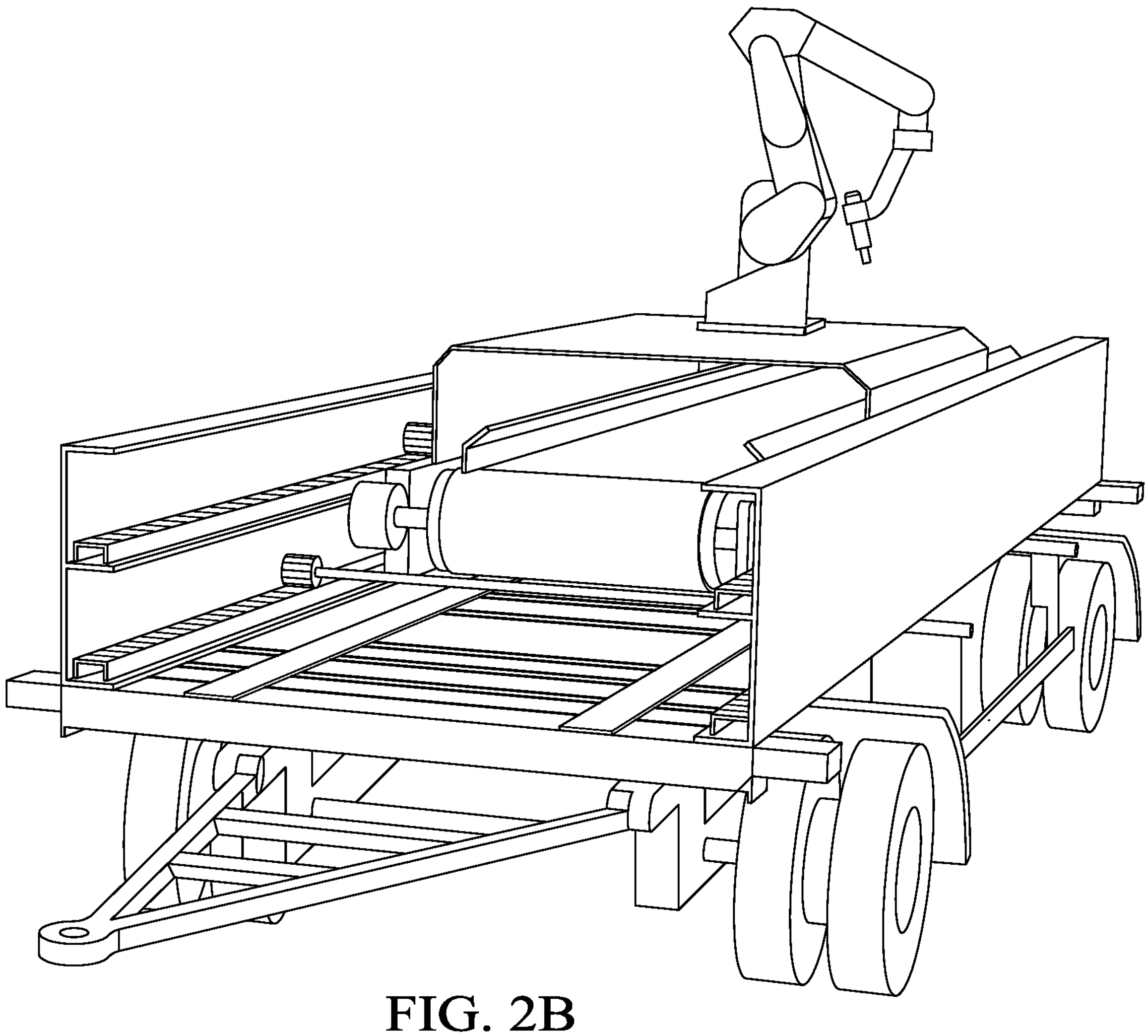
Figure 2C:
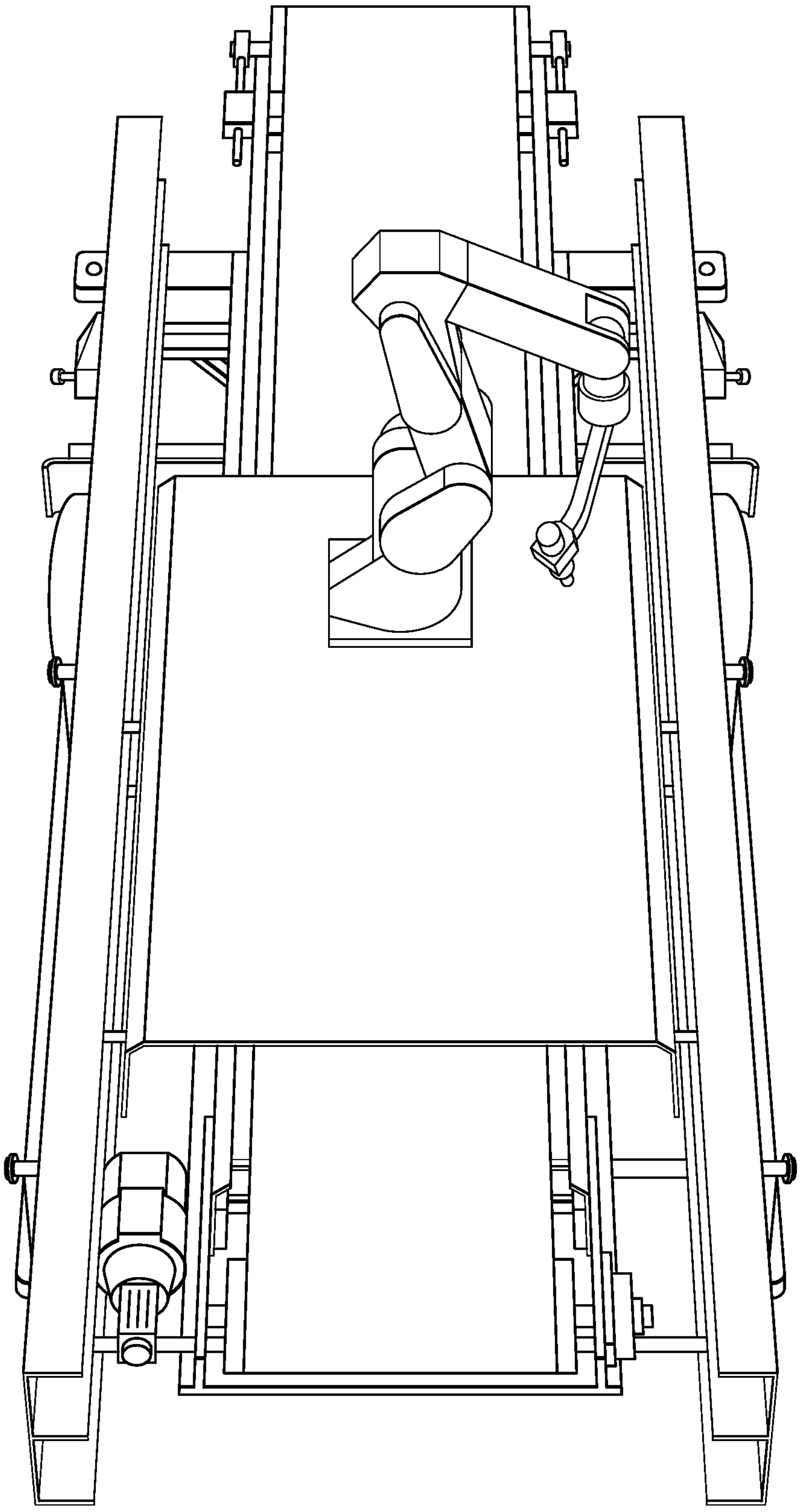

FIGS. 2A-2C are schematic diagrams of an example of an automatic pipeline pig handling system. The system includes a beacon 1 and a Global Positioning System (GPS) antenna 2 mounted on a beacon pole 3. The beacon 1 can output visual and audible signals (for example, light alarms, sound alarms or other signals) or visual signals (for example, light signals) to communicate that the system is in motion or is performing some operation. The GPS antenna 2 can be configured to communicate and exchange signals (for example, data signals) with a GPS system. Using the signals, the GPS antenna 2 can self-locate a position of the system relative to the pig trap as described above.

The system can include an articulated arm 5 that is connected to the controller 21A which can drive the arm 5 to pick up the pig, move it to the desired position and push or retrieve it into and from the pig trap. In some implementations, the arm 5 can be an electro-hydraulic arm that can be operated using an electro-hydraulic unit 13 connected to the controller 21A. The articulated arm 5 can be operated using hydraulic mechanisms, electrical motors or pneumatic actuators or combinations of them. The controller 21A can execute instructions to control motion and operation of the articulated arm 5. For example, the controller 21A can cause the articulated arm 5 to pick up a pipeline pig (not shown) from a first location and place the pig on the conveyor belt 83 and push the pig into the pig trap 32. In some implementations, the controller 21A can automatically and without user intervention control the articulated arm 5 to perform operations based on signals received from one or more sensors (described below). In some implementations, the controller can receive instruction signals (over wired or wireless connections) from another operator (for example, a human operator or another computer or controller) and responsively control the articulated arm 5 to perform operations. In this manner, the articulated arm 5 can be controlled either by the onboard controller or by another controller or computer.

In some implementations, the arm 5 is equipped with one angle and position transmitter per arm element. The arm element transmitters are connected to the controller 21A which determines the sequence of angle and position commands to be sent to the arm 5 to reach the final desired arm position. The system 34 can control the arm 5 based on signals received from one or more of the angles and position transmitters to grip, release, raise or lower the pig (or combinations of them).

In some implementations, the articulated arm 5 is equipped with a load sensor mounted onboard the system 34. The load sensor can sense a weight of the pig and communicate the sensed weight to the controller 21A. The controller 21A can store threshold values associated with arm extension and height during pig maneuvering. The controller 21A can determine if the load sensed by the load sensor will necessitate an arm extension and height within the stored threshold values. When the controller 21A determines that the load is not safe to be moved, it turns on the alarm beacon and aborts the operation by inhibiting the action of arm 5.

In some implementations, the system provides an illumination sensor 3B that is connected to the controller 21A which determines if the camera 15 built-in lighting is needed during dark days. Also, the system can include a sliding tray 6 and a tray guiding rail 7. The tray 6 sustains the articulated arm 5 and associated power unit 13, as well as providing structural support to the motor and transmission mechanism (not shown in FIG. 4A) of tray 6. The tray guiding rail provides support to the sliding mechanism of the tray 6 and the conveyor belt structure. In some implementations, the mechanism can include a pinion which slides on a horizontal rack attached to the tray guiding rail 7. Referring to FIG. 2A, the front camera 15 featured with pan tilt and zoom commands allows the operator to monitor the desired pig operation and to ensure safe conditions free from obstacles above and under the USPGV.

Figure 4A:
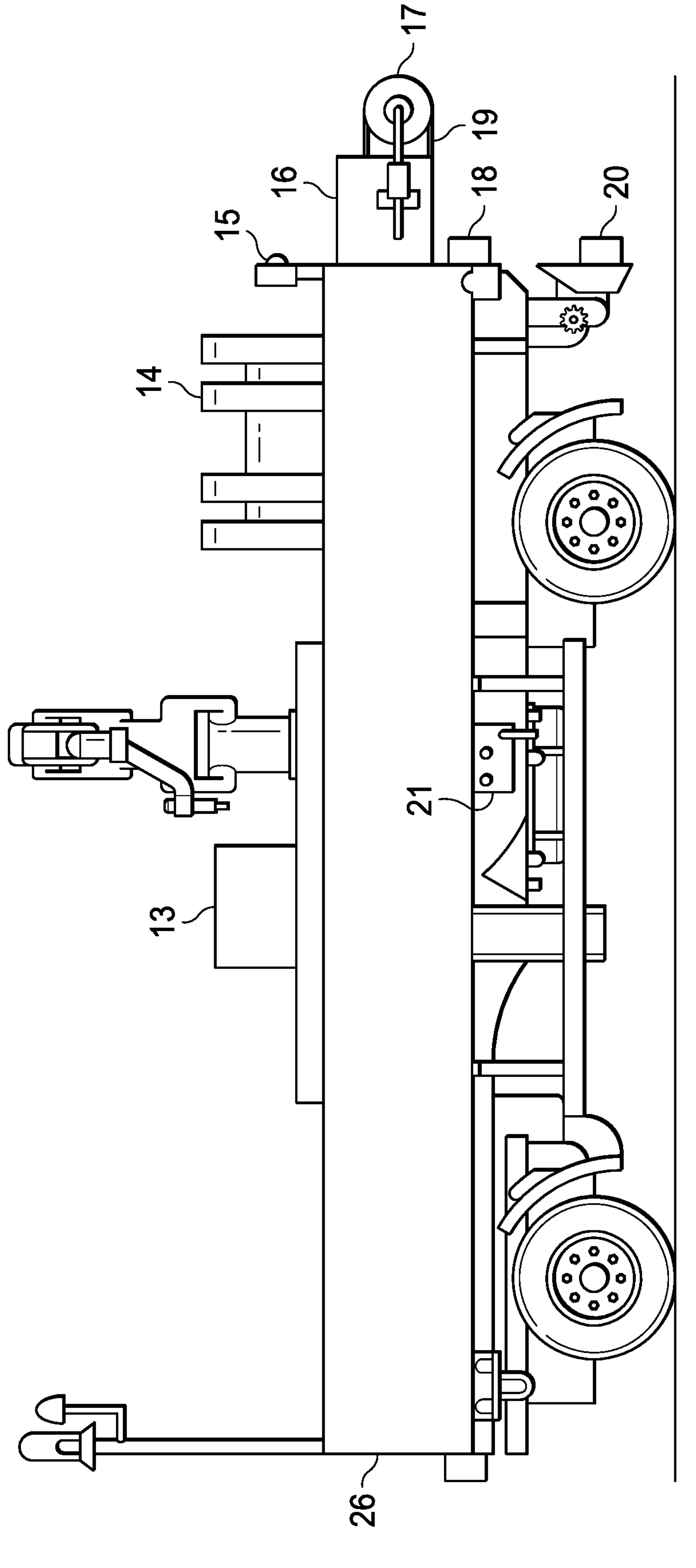
FIGS. 4A-4C are schematic diagrams of a pipeline pig being carried by an example of an automatic pipeline pig handling system.
Figure 4B:
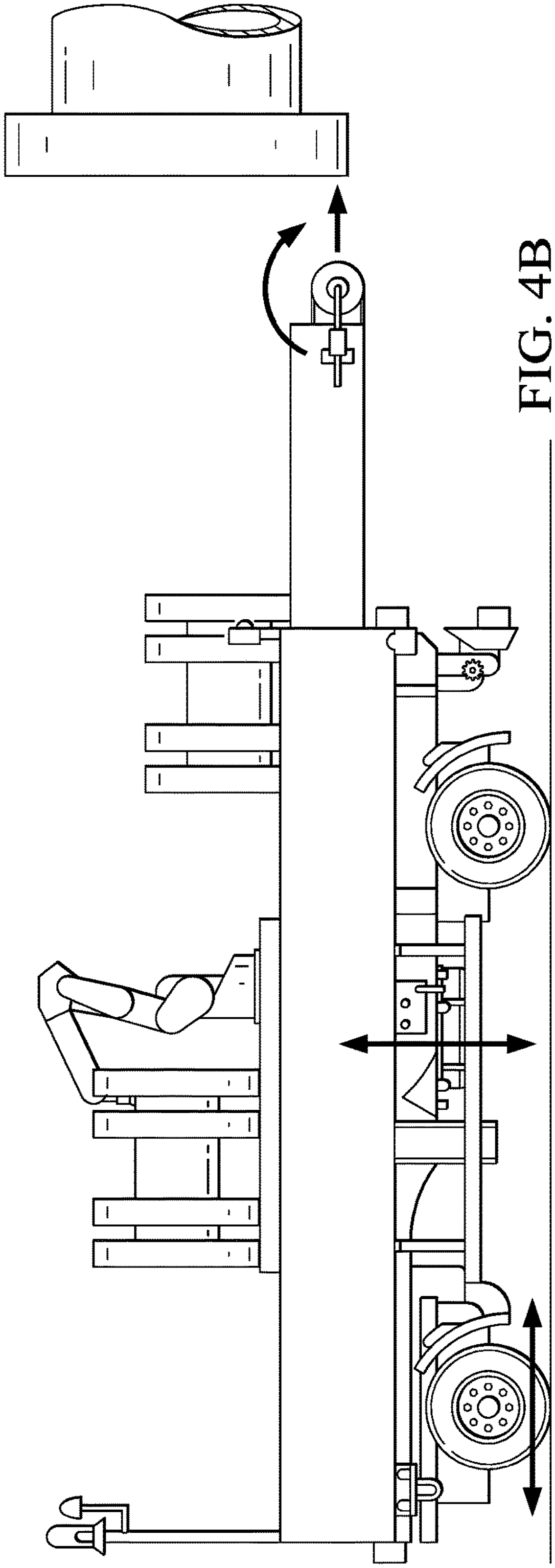

FIG. 2B and FIG. 2C shows the sliding conveyor 84 which provides support by the conveyor belt 83 to the pig or pigs already mounted on as shown in FIG. 4B. The conveyor belt is actioned by the motor 85. The sensors 82 provide indication of the conveyor tray passage by the chassis front end edge to the controller 21 which determines the maximum travel of the conveyor tray outside the chassis edge until the pig trap door is reached. The chassis can also be referred to as an outer body.

Figure 3:
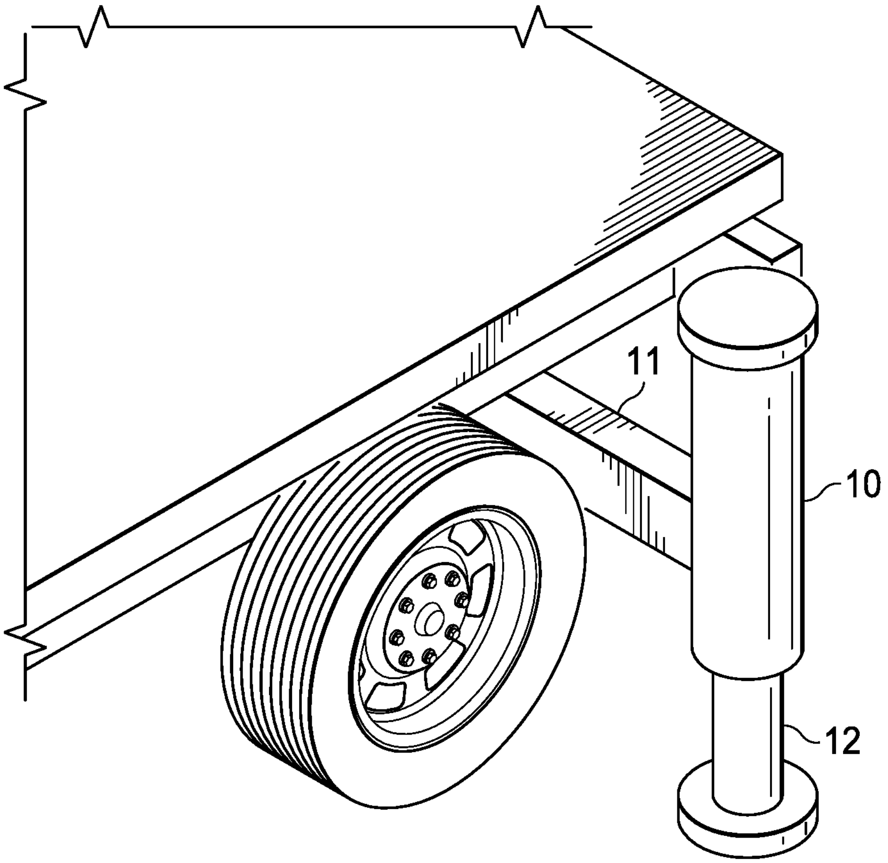
FIG. 3 is a schematic diagram of outriggers of an example of an automatic pipeline pig handling system.

FIG. 3 is a schematic diagram of outriggers of an example of an automatic pipeline pig handling system with one or more outrigger assemblies. The automatic pipeline pig handling system can be substantially similar or identical to the system described with reference to FIGS. 2A-2C. An outrigger assembly can include an outrigger 10 connected to an outrigger pad 12 connected to a telescoping arm of the outrigger 10. The outrigger 10 can provide support for the arm 11 of the hydraulic piston 10. In some implementations, the automatic pipeline pig handling system can include wheels to traverse a path to the pig trap. The system can include multiple steering drivers (for example, one steering driver per wheel or one steering driver for multiple wheels). Each wheel can be individually motorized. The system controller can independently modify or control (or both) a position and speed of each wheel. The system controller can control each wheel to move the system forwards, backwards, left, or right.

Upon reaching the pig trap, the system controller can operate the outrigger 10 to extend the telescoping arm until the outrigger pad 12 contacts the ground. The system controller can continue to extend the telescoping arm after the outrigger pad 12 contacts the ground to raise the system until the wheel no longer contacts the ground. In this manner, the system controller can operate multiple outrigger assemblies to raise the system from the ground or to stabilize the system relative to the ground or both.

Figure 4C:
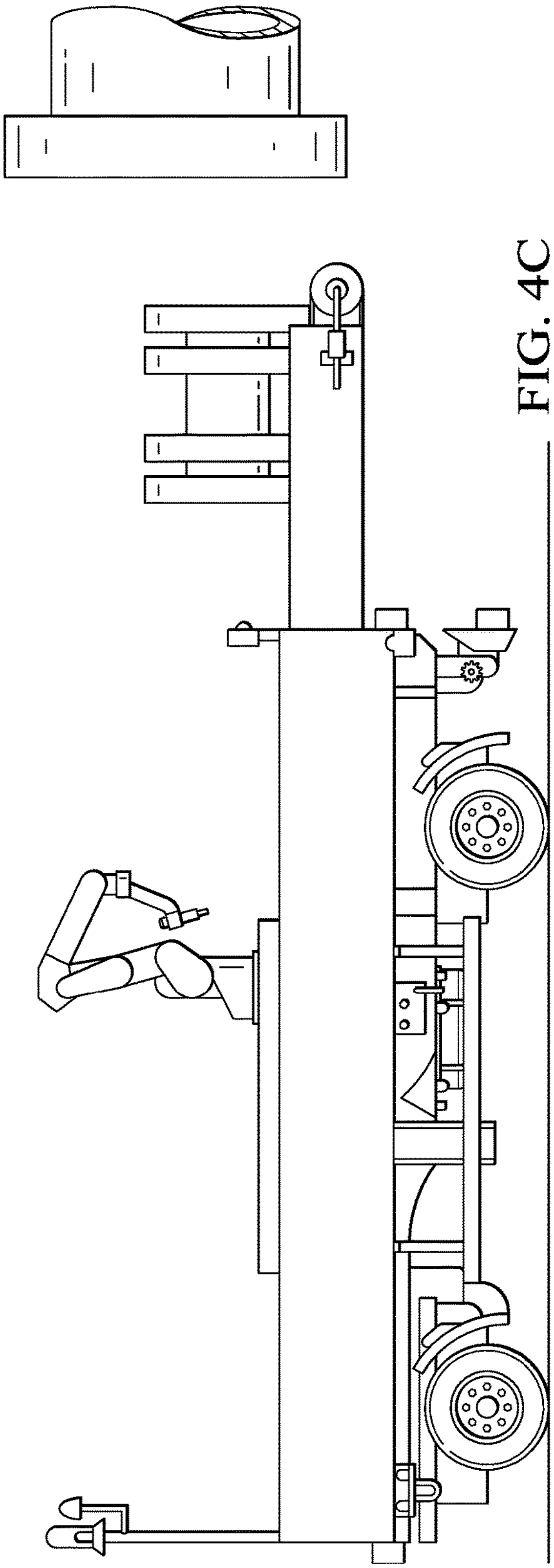

FIGS. 4A-4C are schematic diagrams of a pipeline pig being carried by an example of an automatic pipeline pig handling system. As described above, the automatic pipeline pig handling system can be implemented as an unmanned and self-propelled ground vehicle (USPGV). To do so, the system can include multiple onboard sensors mounted at multiple locations. An on-board controller can receive signals from one or more or all of the multiple on-board sensors, and responsively perform operations without user intervention. The operations can include propelling the system from one location to another, loading a pipeline pig on to or unloading a pipeline pig from the system, or inserting or retrieving the pipeline pig into a pig trap, to name a few.

In some implementations, the system can include an onboard camera 15 positioned at a location on the system. For example, the onboard camera 15 can be positioned at the front of the system. In general, the onboard camera 15 can be positioned anywhere on the system, for example, the rear end or somewhere between the front and rear ends. The onboard camera 15 can have different angles of view to allow capture of different angular extents. In some implementations, the onboard camera 15 can be controllable to point the viewfinder at different directions surrounding the system. The camera is featured with pan, tilt and zoom commands such that the operator can remotely observe positioning of the pig at the pig trap entry door.

The system can include a conveyer 17 that can span at least a portion of a longitudinal dimension of the system between the front end and the rear end. Using an articulated arm, similar to the arm described above with reference to FIG. 2A-2C, a pig 14 can be placed on the conveyer 17. The conveyer 17 can include a conveyer belt 19 which can be operated to move the pig 14 forward or backward along the longitudinal dimension of the system between the front end and the rear end. The system can include a distance sensor 18 and an obstruction sensor 19. In some implementations, the distance sensor 18 can be mounted on a front end of the system adjacent to (for example, below) the conveyer 17. The system can also include a gas sensor 20 that can detect gas, for example, H2S gas or other gas. The system can also include a low explosive mixture sensor mounted to the chassis (outer body). In some implementations, the obstruction sensor 19 and the gas sensor 20 can be positioned at substantially the same height from the ground. One sensor of each type is described or shown. However, the system can include multiple sensors of each type. For example, the obstruction sensor 19 can be mounted between two gas sensors 20 on the same supporting structure.

The distance sensor 18 can measure a distance between the chassis (outer body) and the pig trap. The obstruction sensor 19 can determine a presence of an obstruction along the trajectory that the system 34 takes to the pig trap door 48. When the obstruction sensor 19 detects an obstruction, the controller 21A can cause the system 34 to take a route that avoids the obstruction.

In some implementations, the controller 21A to which the multiple onboard sensors (for example, the onboard camera 15, distance sensor 18, obstruction sensor 19, or other sensors) can be connected either using wires or wirelessly can also be onboard the system 34. The controller 21A can be implemented as processing circuitry (for example, including processors arranged and connected on a motherboard) or a computer-readable medium storing instructions executable by one or more computer processors to perform operations. In some implementations, based on and responsive to the signals received from the multiple onboard sensors, the controller 21A can cause the system to operate as a USPGV.

The controller 21A can execute one or more algorithms to operate the system in one of the following modes—an auto tracking mode and a manual motion mode. In the auto tracking mode, the operator selects auto tracking by GPS, by ground beacons 51, or by another technique previously mentioned. The operator can select the trajectory that the USPGV will follow. Once selected, the controller 21 determines the USPGV's current position and determines the sequence of steering commands to be sent to the chassis front wheels. The controller 21 first sends a motion command to the rear motorized wheels while monitoring the USPGV speed by reading the speed sensor (not shown). Next, the controller executes the sequence of steering movements to ensure the USPGV arrives to the desired destination. If an obstacle is detected, the controller 21A sends the stop command to the USPGV and determines the new sequence of steering commands to avoid the obstacle including reverse, drive and turn commands. The operator can monitor the USPGV motion by the camera 15 and determine if the USPGV must be switched to manual motion mode. While the USPGV moves, the controller 21 monitors the sensors and flashes the beacon 1 and transmits a signal to the operator. In the manual motion mode, the operator can fully control the system manually using a remote control 49. The controller 21A will continue receiving obstacle, distance, inclination and height sensors as well as reading GPS position and receiving camera images in order to provide the operator with the information necessary to perform USPGV maneuvers.

Referring to FIG. 4A, in some implementations, the articulated arm 5 is equipped with a proximity wireless reader 21B capable of reading data from a pig equipped with wireless identification transmitters and or wireless data transmission module to communicate operation log data to the system. The reader 21B further transmits the information to the controller 21A which obtains the dimensional and weight data of the pig from a local database resident in a non-volatile memory in order to determine the position of the arm 5 in relation to the pig to push or pull the pig into or from the pig trap.

FIG. 4B shows the pipeline pig being positioned within the pig trap door. To do so, the controller can operate the wheels of the system to transport the system to a location near the pig trap door. The controller can operate the system to change (for example, increase or decrease) a height of the pig relative to the ground. For example, by operating the outriggers or the scissors lift, the controller can increase a height of the pipeline pig such that the conveyor belt is raised to a bottom portion of the pig trap door. The controller can operate the sliding tray to extend past a front end of the system until a front end of the tray is substantially aligned with the bottom portion of the pig trap door. The controller can then operate the conveyer belt to move the pipeline pig to the entrance of the pig trap door. The handling system can include a counterweight on a rear end to balance a cantilever load created as the pig is moved beyond the front end of the handling system. Alternatively, or in addition, the articulated arm can provide support to the pipeline pig thereby decreasing a load on the sliding tray. FIG. 4B shows the pipeline pig being moved from a first position near the rear end of the system to an intermediate position between the first position and the trap door entrance. FIG. 4C shows the pipeline pig moved to a second position between the intermediate position and the pig trap door entrance. At this position, the articulated arm can push the pipeline pig through the pig trap door.

Figure 5:
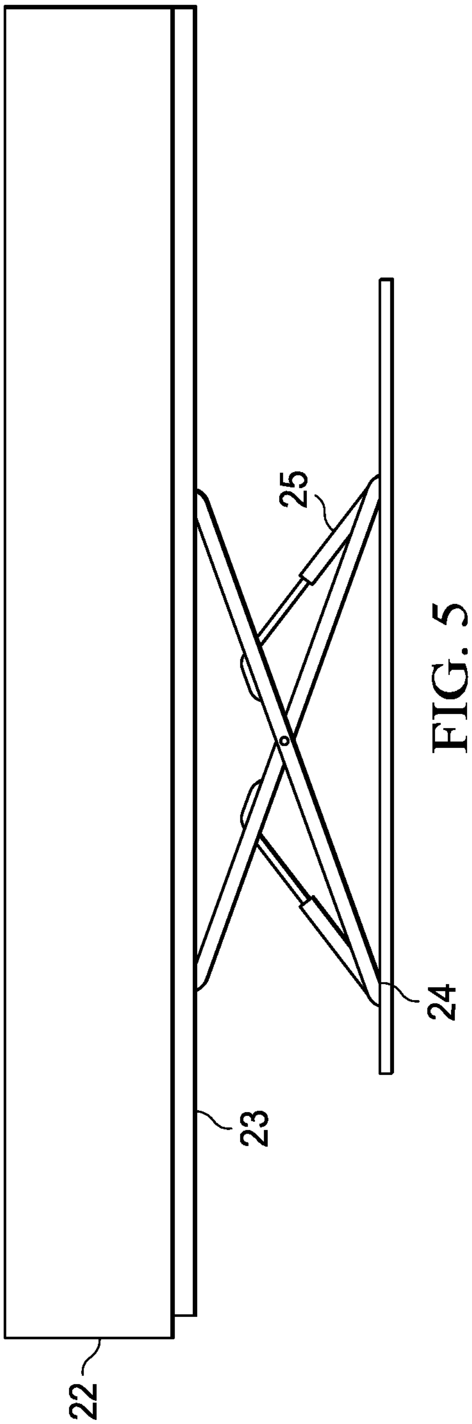
FIG. 5 is a schematic diagram of an example of an automatic pipeline pig handling system with a scissor lift.

FIG. 5 is a schematic diagram of an example of an automatic pipeline pig handling system with a scissors lifter. FIG. 5 shows the hydraulic lifter of the USPGV consisting of a scissor mechanism actioned by the hydraulic pistons (for example, piston 25) which push against the structure that supports the guiding rails 7 and 8 while the scissors mechanism, is attached to the USPGV chassis 24.

Figure 6:
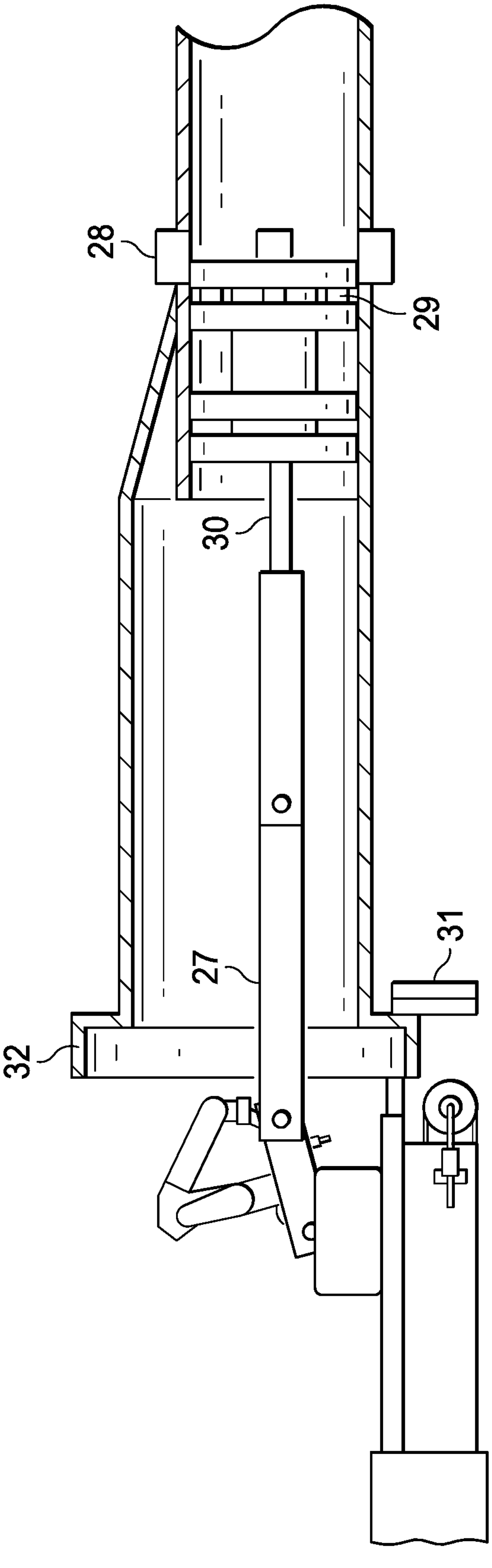
FIG. 6 is a schematic diagram of an articulated arm of an example of an automatic pipeline pig handling system.

FIG. 6 is a schematic diagram of an articulated arm of an example of an automatic pipeline pig handling system. In some implementations, the articulated arm 27 can transition between a fully folded state and a fully extended state. The articulated arm 27 can be operatively connected to a controller (for example, the controller 21A described above), which can provide instructions responsive to which the articulated arm 27 can be positioned at any position between the fully folded state and the fully extended state. In some implementations, the articulated arm 27 can include a telescoping piston which can extend a reach of the articulated arm 27 in the fully extended state. For example, the articulated arm can be transitioned from the fully folded state to an extended state in which the telescoping piston has not been extended. The reach of the arm can further be extended by extending the telescoping piston.

In addition, the articulated arm 27 can be connected to the system (for example, the USPGV) on a rotatable base. For example, the default position of the articulated arm 27 can be the fully folded state. In response to an instruction from the controller, the articulated arm 27 can pick up a pipeline pig by rotating about the base to a location of the pipeline pig and extending from the fully folded state. Upon picking up the pig, the articulated arm 27 can retract and rotate to place the pig on a conveyer (for example, the conveyer 17) on the system. The articulated arm 27 can have three joints. About each joint, the articulated arm 27 can rotate 360 degrees on the horizontal plane and 90 degrees on the vertical plane. The arm includes a hook that allows the pig to be engaged and lifted.

In another example, the articulated arm can push the pipeline pig through the trap door 32. For example, one or more position sensors (for example, pig position sensor 28) can be affixed (for example, located directly on) a portion of the pipeline connected to the trap door 32. Similarly, one or more position transmitters (for example, pig position transmitter 29) can be affixed (for example, located directly on) the portion of the pipeline connected to the trap door 32. The articulated arm can extend to the fully extended state (or a portion of the fully extended state) to push the pipeline pig into the pipeline through the trap door 32. The pig position sensor (or sensors) 28 can sense a position of the pig in the pipeline and communicate the position to the pig transmitter (or transmitters 29). The pig transmitter 29 can communicate the position of the pig within the pipeline to the transmitter/receiver 31, which can transmit the communicated position of the pig within the pipeline to the controller 21A.

The controller 21A can cause the articulated arm to insert the pig, that is, by extending the articulated arm, into the pipeline until the pig has reached a desired position within the portion of the pipeline. For example, the controller 21A can store a desired position in a computer-readable memory. When the position of the pig received from the transmitter/receiver 31 (mounted either on the trap door 32 or the USPGV) matches or is substantially equal to the stored desired position, then the controller 21A can stop a further extension of the articulated arm. For example, the transmitter/receiver 31 can continuously or periodically communicate a distance between the pig and the USPGV. The controller 21A can then cause the articulated arm to release the pipeline pig and to remove the arm from within the pipeline.

Figure 7:
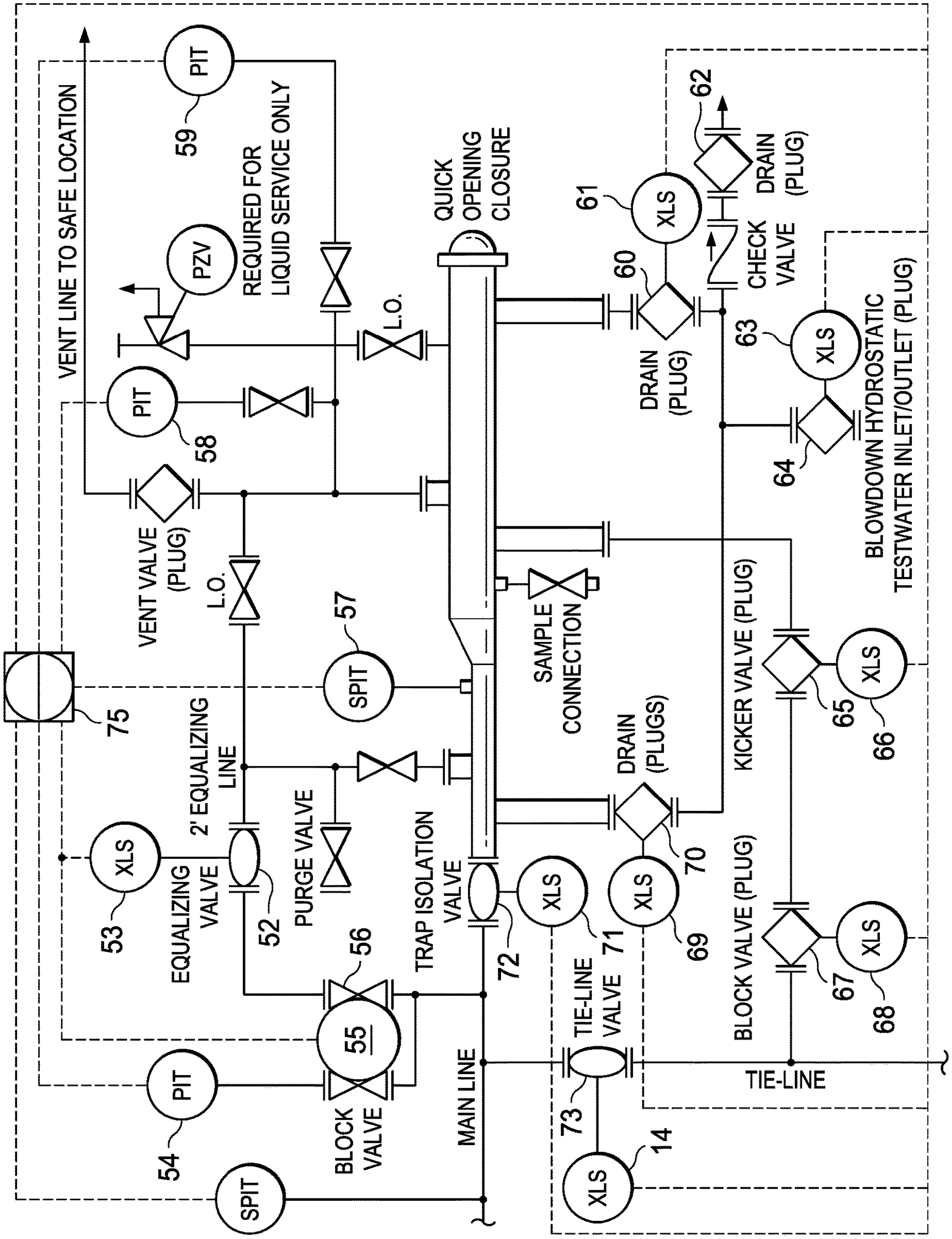
FIG. 7 is an operational schematic diagram showing a pig trap and associated valves to flow the pipeline pig through the pipeline.

FIG. 7 is an operational schematic diagram showing a pig trap and associated valves to flow the pipeline pig through the pipeline. In one implementation, the pressure sensors 58 and 59 work in a 2-out-of-2 voting configuration to ensure that the pig pressure is measured within acceptable confidence level for the controller 47 to transmit a permissive signal to the USPGV controller 21 to allow initiating pig operations. A 2-out-of-2 voting configurations requires that two sensors are in agreement with one another. 74 is the limit switch of the lateral valve 73 which opens or closes the flow to the processing plant. The limit switch 74 is connected to the controller 47. 71 is the limit switch of the trap valve 72 which isolates the trap from the line. The limit switch 71 is connected to the controller 47 to indicate when the trap is ready for launching or receiving.

Figure 8:
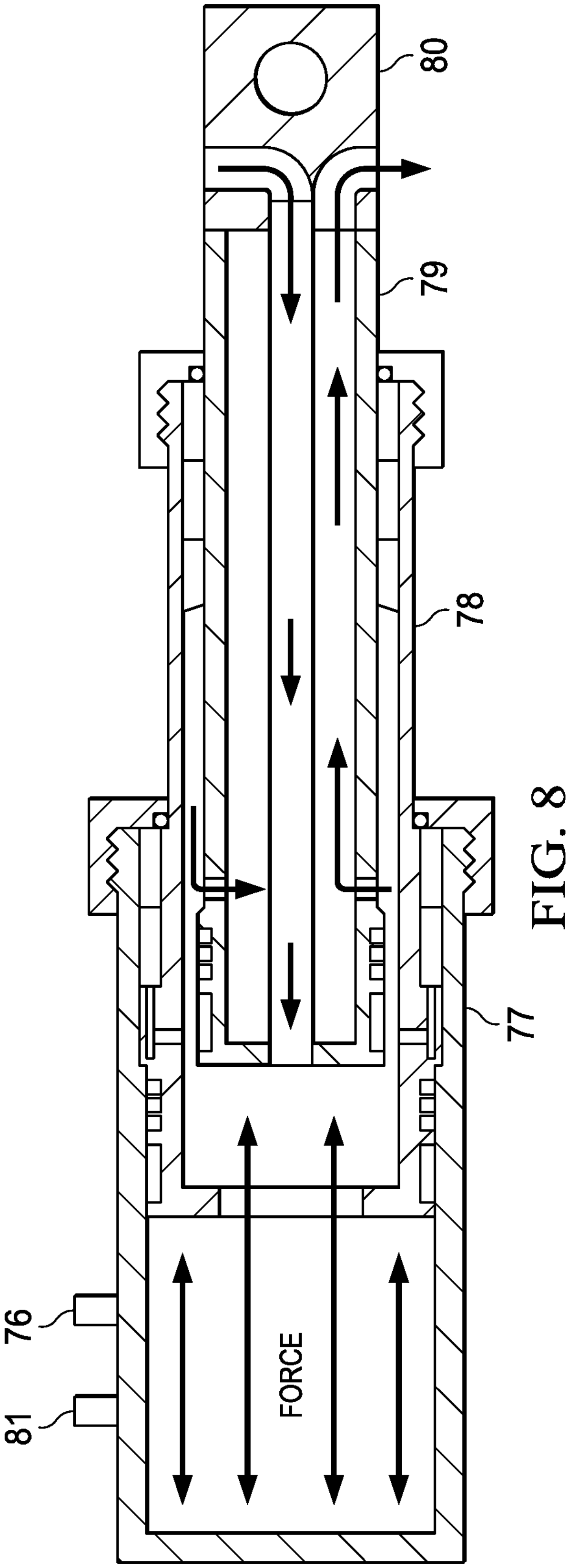
FIG. 8 is a schematic diagram of a hydraulic double acting piston of an example of an automatic pipeline pig handling system.

FIG. 8 is a schematic diagram of a hydraulic double acting telescopic piston of the articulated arm of an automatic pipeline pig handling system. This telescopic piston is controlled by the onboard controller 21 and is used for both launching and receiving operations. In the case of launching operations, the telescopic piston is used to push the pig into the pig's final position inside the pig trap while for pulling, the telescopic piston is used to start retrieving the pig from its initial position inside the pig trap. The outer cylinder 71 allows the middle inner cylinder to slide out or slide in by the action of the hydraulic fluid ingress through the port 81 or egress through the port 76. Similarly, the fluid ingress allows the end piston 79 to slide out to allow the telescopic piston to reach the maximum length.

Figure 9:
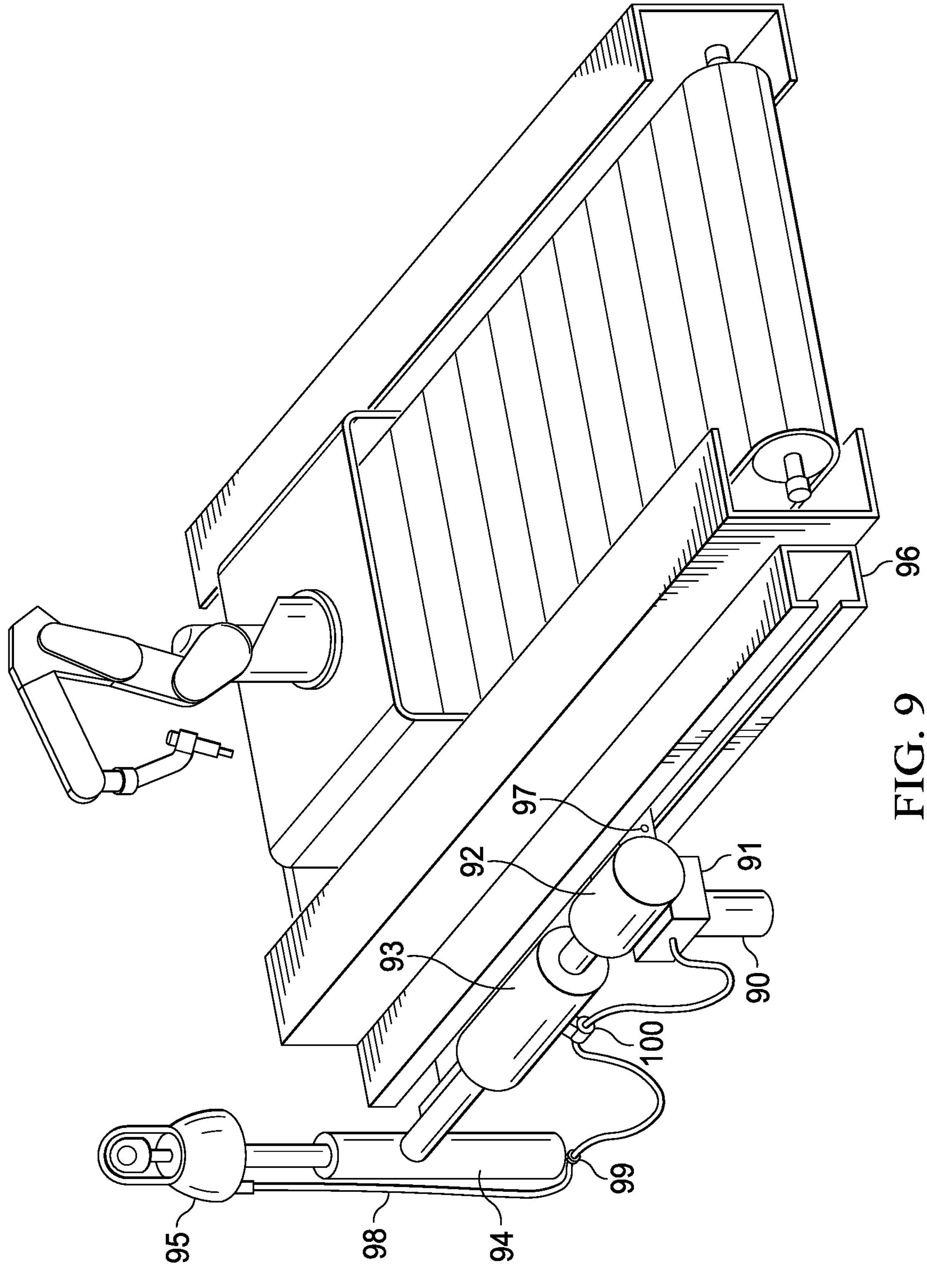
FIG. 9 is a schematic diagram of the monitoring camera equipped with pan, tilt and zoom commands and hydraulic pistons to control vertical rotation, horizontal and vertical movements of the camera.
Figure 11:
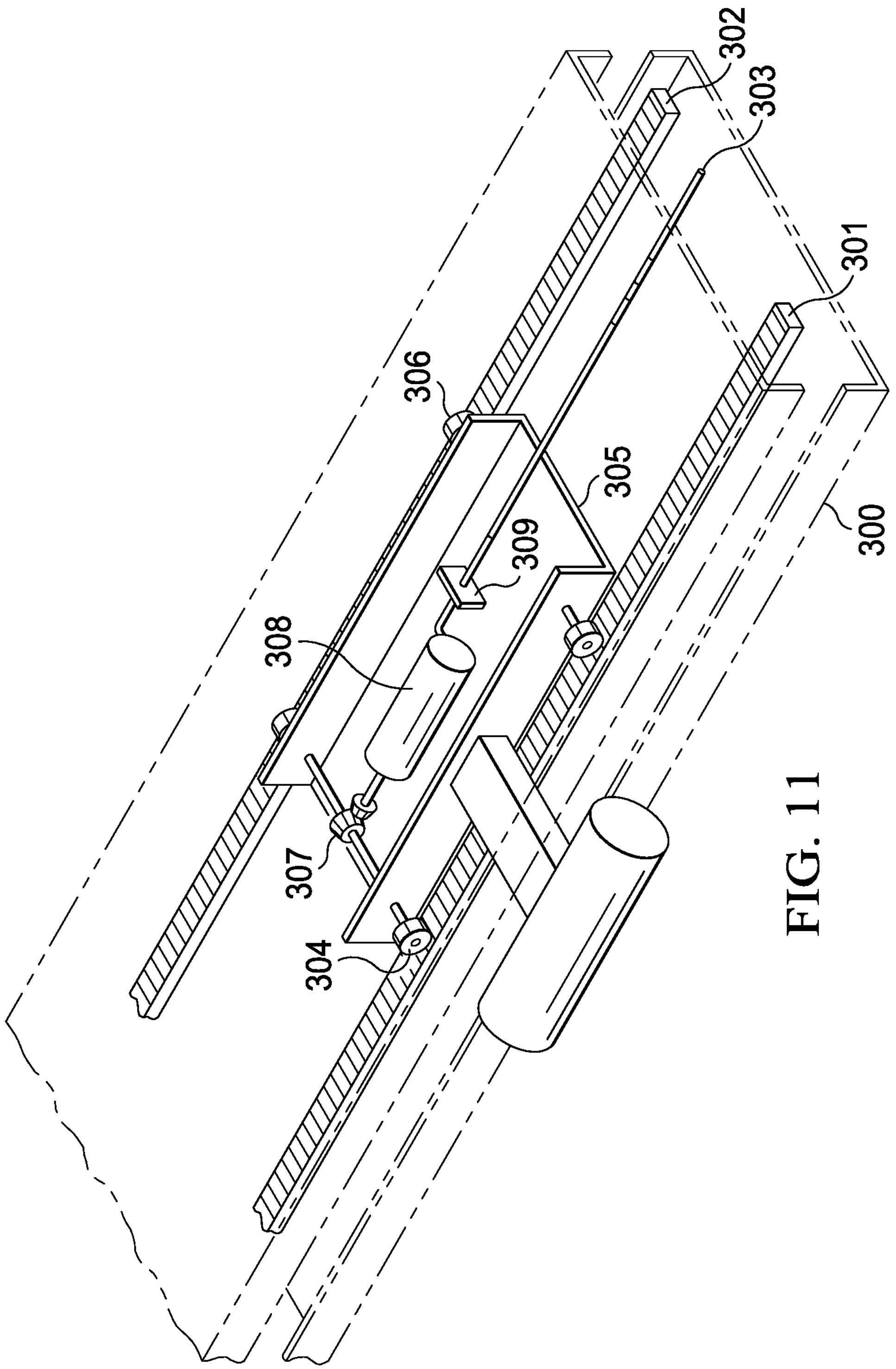
FIG. 11 is a schematic diagram of an example of the camera sliding tray which is mounted on each lateral of the USPGV to allow a video camera to move horizontally along the USPGV guiding rails.

FIG. 9 is a schematic drawing of an example of the electro hydraulic sliding camera mechanism mounted on the lateral outer sides of the guiding rail 7 to allow the operator to remotely monitor details of the scraping operations as well as identify the type of obstacles under the USPGV chassis (outer body) and its surroundings. The mechanism provides to the camera 95, 0 to 180 degrees rotation on the vertical plane perpendicular to the guiding rail 7, function provided by the hydraulic actuator 92, axial movement along the horizontal axis by the hydraulic piston 93 and vertical movement by the hydraulic piston 94. The hydraulic actuator 92 is mechanically connected to a sliding trailer mounted inside the camera sliding rail 96. An example of the sliding trail is shown in FIG. 11. The camera 95 is equipped with pan, tilt, and zoom controls. The camera control and power wiring runs inside a flexible conduit 98, which provides sufficient length for the piston 94 to extend and reach its maximum length. For this purpose the conduit 98 is affixed to a conduit fastener 99 attached to the piston 94 body. In the same manner the flexible conduit 98 is long enough to allow the piston 93 to reach its maximum length. For this purpose, the conduit fastener 100 holds the conduit fixed at a point where the fastener 100 is attached to the piston 93 body. In one implementation the USPGV is equipped with two cameras one on each side, mounted each on a camera rail identical to the rail 96. The hydraulic pistons are powered by the hydraulic unit 90 which is wired to the controller 21. The wiring, not shown in FIG. 9, runs from the electrohydraulic manifold 91 and runs through the actuator enclosure 92 and passes thru the bracket 97.

Figure 10:
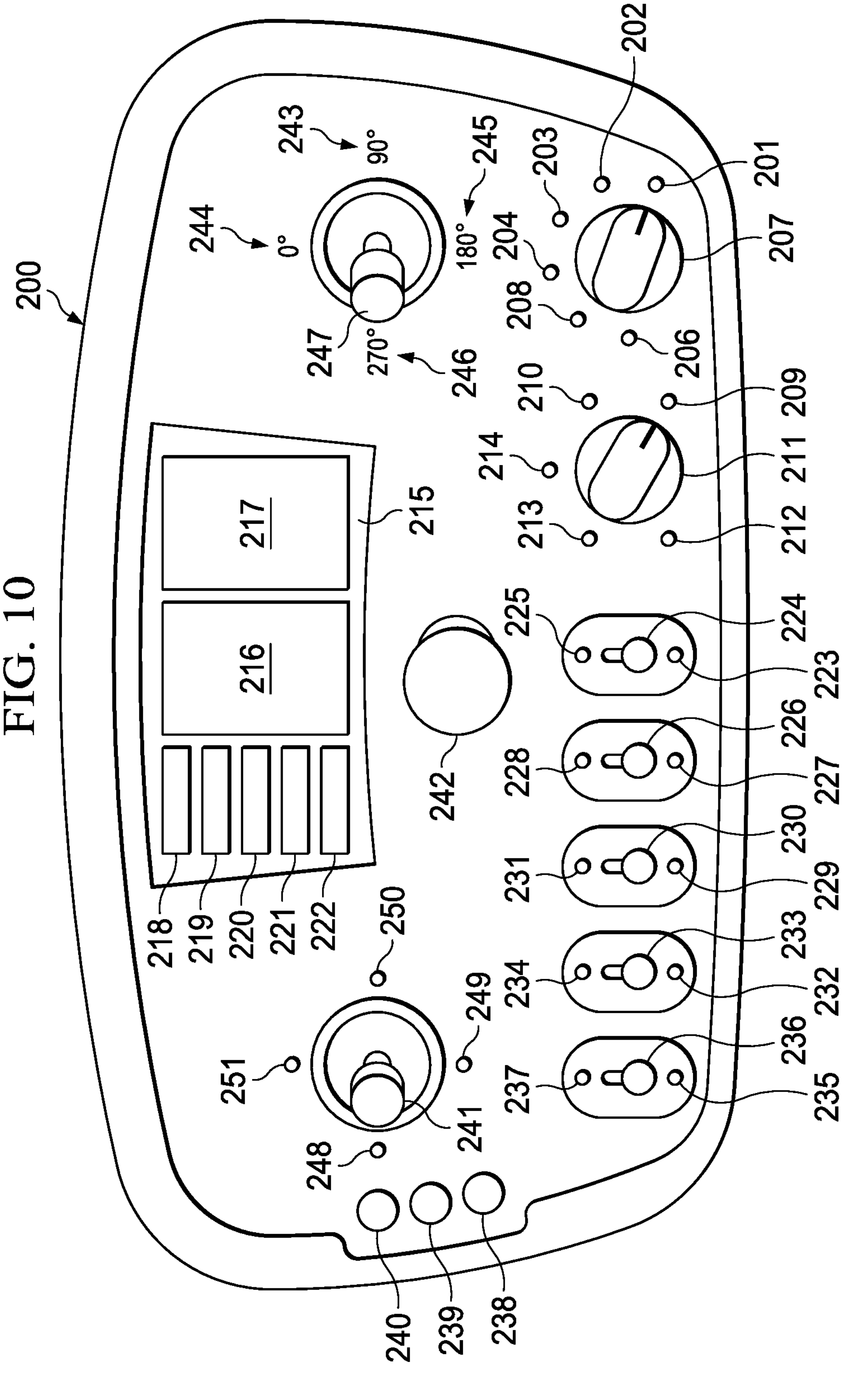
FIG. 10 is a schematic drawing of an example of remote controller to be used by an operator.

FIG. 10 is a schematic drawing of an example remote controller to be used by an operator. The remote controller has a right joystick 247 to control pan movement continuously from 0 to 360 degrees of the monitoring video camera 15 selected by the selector switch 207. In one implementation, the camera 15 is mounted on the mechanism shown in FIG. 9 on the right USPGV guiding rail 7 and one more camera on identical mechanism on the left side. The selector switch 207 enables which camera out of the two will be pan-controlled by the joystick 247 and also enables the joystick 241 to control more zoom at position 251, less zoom at position 249, and tilt up at position 250 and tilt down at 248. The selector 207 at position 201 enables the push buttons 238, 239, and 240 to move the hydraulic lifter pistons 25 to move the sliding conveyor down stop or up respectively. The selector 207 at position 202 enables the articulated arm tray 6 to be controlled by the joystick 247 to move forward at position 243 and backward at position 246. The selector 207 at position 203 enables the control of the conveyor tray 16 which once selected can be moved in and out of the chassis by the joystick 247 at the position 243 and 246 respectively. The selector 207 at position 204 enables the control of the right camera and at position 208 the control of the left camera, both of them by the action of the joy sticks 247 and 241. The selector 207 position 206 is reserved to enable the command of the conveyor belt by the push buttons 238, 239, and 240, to move backward, stop and move forward. The two positions switch 224 enables the USPGV to work in either auto tracking mode position 225 or manual at position 223. The two positions switch 226 enables the USPGV to work in either auto or manual pulling/pushing pig mode positions 227 and 228 respectively. The two positions switch 236 enables the USPGV to either work in pushing or pulling pig mode of operations at positions 237 and 235 respectively.

The two positions switch 233 enables the Horizontal, Vertical and Rotational (HVR) commands of the right or left side camera 15, selected by the selector 207, to be controlled by the joysticks 247 and 241. When the 233 switch is at position 232 the joysticks 247 and 241 are enabled to control HVR. When it is at position 234 the HVR control is disabled. The two positions switch 230 enables at position 231 the joysticks 247 and 241 and the selector 211 to control the arm and disables all arm control commands at position 229. The selector switch 211 enables the control of each segment of the arm, from the first at position 209, the second, 210, the third at 214, the forth 213 and the telescopic hydraulic piston of FIG. 8 at position 212. For each arm segment, the joystick 241 can control segment rotation from 0 to 90 degrees or more depending on the arm mechanical construction and settings by moving from position 250 to 248 respectively as well as controlling the extension or retraction of the telescopic piston of FIG. 8. The remote control has an abort push button 242 which stops all activities of the entire USPGV.

FIG. 11 is a schematic diagram of an example of the camera sliding tray which is mounted on each lateral of the USPGV to allow a video camera to move horizontally along the USPGV guiding rails. The pinion 304 moves on the geared rack 301. The electrical motor 308 moves the gears 307 which transmits the rotational movement to the pinion 304. The pinion 306 and its pair on the other side of the supporting tray 305 allows the tray 305 to keep aligned and distribute the weight on both geared racks 301 and 302. The racks 301 and 302 are attached to the "C" profile 300 which is attached to the guiding rail 7. The motor 308 power, control as well as video camera power and control wiring run in the cable bundle 303, which terminates in the distribution box 309 which also contains the motor direction inverter to allow the tray 305 to move forward and backward, thus moving the video camera horizontally.

Figure 12:
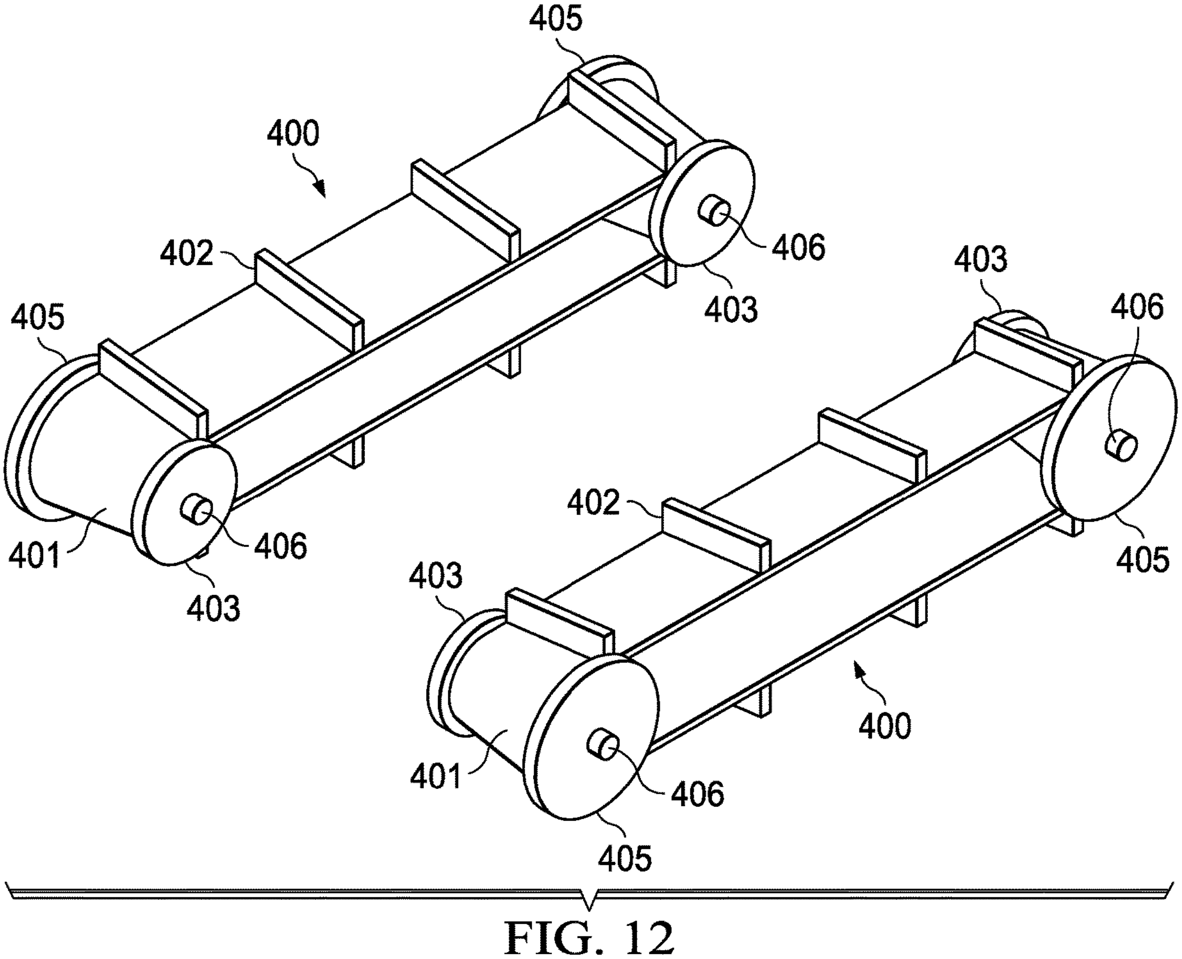
FIG. 12 is a schematic diagram of an example of the two sided conveyor of two separated belts.

The controller of the automated pipeline pig handling system described here can receive signals from multiple sensors and, based on the received signals, operate the system to perform multiple operations. The controller can operate the system to execute pig launching and receiving tasks in pipelines equipped with pig traps. For example, the controller can operate the system to pick up one or more pipeline pigs of either cleaning type or inspection type (or both) from a support structure. The pig is supported by the conveyer 16. Referring to FIG. 1, the conveyor belt (not numbered yet on FIG. 1). In one implementation, the conveyor belt includes one single belt covering the entire width of the conveyor sliding tray 16. In another implementation, the conveyor is formed by two separated belts which are each inclined towards the axial centerline of the USPGV in order to ensure the pig remains on the axial direction as it is retrieved from or pushed into the pig trap. In another implementation, the pig can be supported by a bed of passive rollers where the actuated arm moves the pig in the horizontal direction FIG. 12 is a schematic diagram of an example of the two sided conveyor of two separated belts. On one side of the conveyor the belt 401 consists of two plates 403 and 405 connected together by a shaft 406. The belt 401 is provided with a stopper 400 regularly spaced. The user stopper can be inserted in the belt on slots machined on the belt such that the user can adjust the gap between stoppers.

The controller can operate the system to place the picked up pig or pigs at the desired position on the conveyer belt. The controller can operate the system to move the conveyor to change locations of the pigs on the conveyer belt. To do so, the conveyer belt can include a sheet of rubber (or other flexible material) rolled over two cylinders spaced apart along a longitudinal dimension of the system. To change the locations of the pigs on the conveyer, the controller can cause the two cylinders to rotate in either clockwise or counter-clockwise direction.

The controller can operate wheels of the system to transport the system from a first location to a second location, for example, near the vicinity of the trap door. For example, an operator can program a trajectory into a computer-readable memory in the system. The controller can access the trajectory in the memory and control the system to traverse the trajectory.

The controller can operate the system to adjust a height of the pig relative to the ground. For example, the controller can operate the outriggers or the scissors lifter (or both) described above to adjust the height of the pig relative to the ground. The controller can operate the system to position the pig inside the pipeline through the trapdoor. To do so, the automated pipeline pig handling system can include an automated pig door opener and locking/unlocking device.

Referring to FIG. 6, the automatic door opener consists of redundant hydraulic pistons 37, each of which is connected on one end to the pig door hinge and the other end pivoting on another hinge attached to the supporting pole 36. The hydraulic arms are powered by the hydraulic unit 35 and controlled by the local controller 47.

Depending on whether the pig is to be launched into or received from the pipeline, the controller can operate the system to detect a pressure in the pressure trap or to purge, pressurize or depressurize the pig trap (or both). The system purges the trap by opening the drain valve 45 which is connected to the local controller 47. The controller 47 and the onboard USPGV controller 20 are connected by a wireless link. The controller 47 transmits to the controller 20 the status of the trap and its readiness to commence pig receiving or launching operations. The USPGV can be operated remotely and manually according to the below table of functions.

| S. No | Function | Manual by remote controller | Automatic (On-board controller) |
|---|---|---|---|
| 1. | Move forward and backward the trailer | x | x |
| 2. | Turn left and right the trailer | x | x |
| 3. | Move up, down and rotate the hydraulic arm at full length for extend, pushing or pulling the pig. | x | |
| 4. | Activate conveyer | x | x |
| 5. | Slide conveyer | x | x |
| 6. | Slide hydraulic arm | x | x |
| 7. | Turn on alarm beacons | x | |
| 8. | Activate alarm horn | x | |
| 9. | Abort operation | x | |
| 10. | Switch to auto mode | x | |
| 11. | Initiate pushing or pulling of pig | x | x |

-continued

| S. No | Function | Manual by remote controller | Automatic (On-board controller) |
|---|---|---|---|
| 12. | Activate door opening and closing | x | x |
| 13. | Open and close the pig trap door | x | x |
| 14. | Move the trailer Chassis up and down | x | x |
| 15. | Moving the trailer forward and backward by electrical motor operated action on 4 wheels and 2 steering front wheels. | x | x |
| 16. | Turning direction of the trailer while moving on right and left. | x | x |
| 17. | Moving up and down the trailer by hydraulic suspension | x | x |
| 18. | Sliding the conveyer to move the pig forward and backward | x | x |
| 19. | Moving the pig by a conveyer | x | x |
| 20. | Moving up, down rotate the hydraulic arm. | x | x |

The controller can operate the system to execute multiple safe tasks by utilizing actuated pig associated valves. The tasks can include stopping, aborting, or reinstating pig trap conditions. The tasks can also include opening and closing the pig trap door following a safety-compliant sequence.

Figure 13:
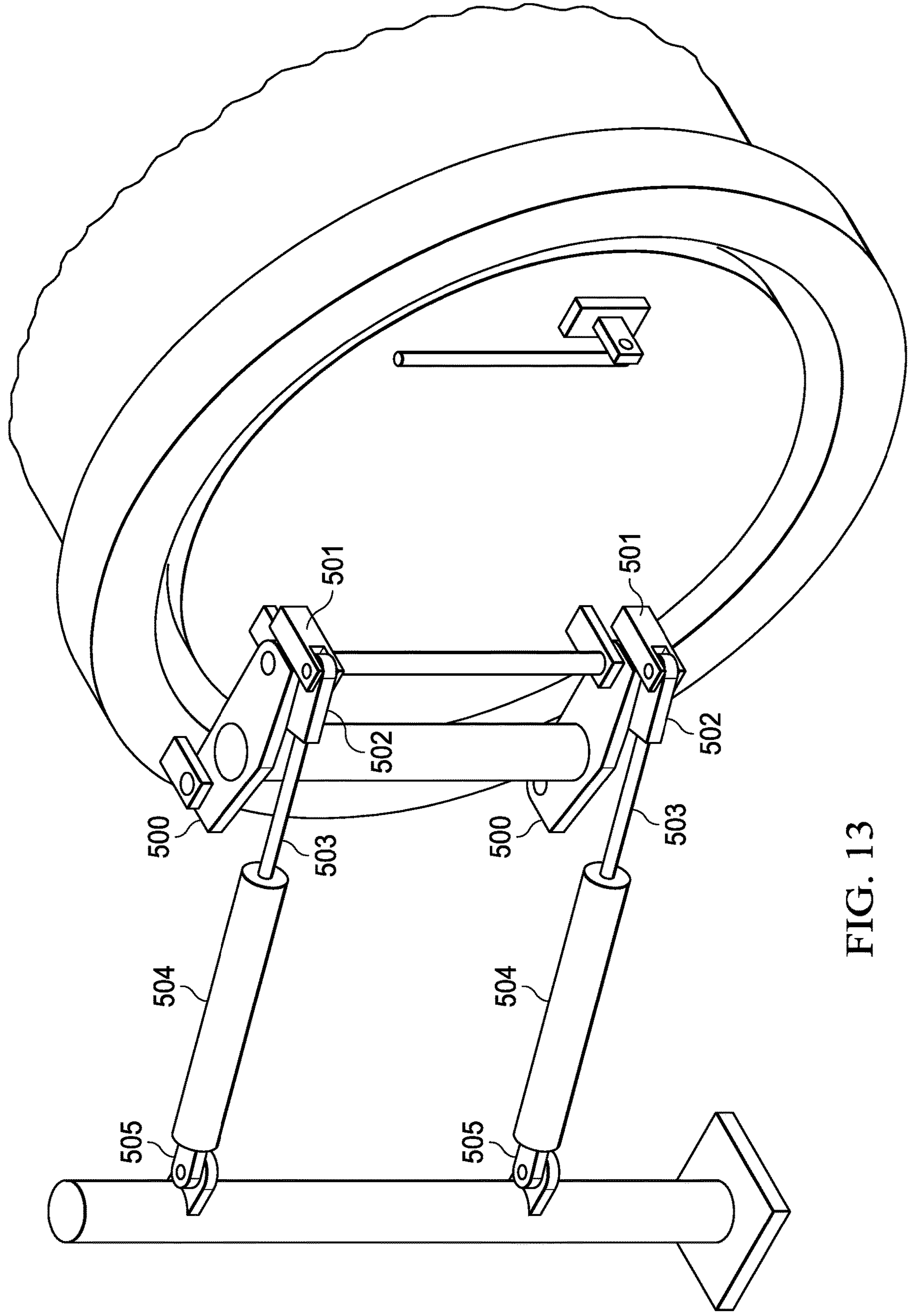
FIG. 13 is a schematic diagram of an example of the automatic door opener.

FIG. 13 is a schematic diagram of an example of the automatic door opener showing the hydraulic piston main hinge 505 attached to the support pole, the pivot engaging block 501 which is inserted in the manual level insertion hole of the lower side of the door hinge 500. The end 502 of the piston arm 504 is linked to the pivot by a bushing which allows moving the trap door by contracting the piston arm hydraulically.

If the operator selected automatic pushing of the pig: first, the USPGV moves towards the trap door and aligns itself until the USPG axial axis is aligned to the axial direction of the trap. Next, the UPSG is positioned at a safe distance from the trap door to allow the door to open. The distance between the USPGV and the trap is measured by the distance sensor and the controller 20 determines how much closer the USPGV must move until the final position is reached. In absence of obstacles and after receiving a permissive command from the local trap controller 47, the USPGV will initiate the operation selected by the operator on the remote control. Once the UPSGV controller 20 receives the reading of the pig trap upon loading the pig on the conveyor belt by the operator, the USPGV moves the sliding conveyor 16 out of the chassis until it reaches a safe distance to the trap door, which is determined by the controller 20 after the USPGV reaches its final position. Next, the conveyor belt 17 is activated and the belt motors rotate to move the pig mounted on the belt close to the trap door. The stoppers 400 ensure the pig does not slide on the conveyor belt as it moves to the trap door. Next, the pig reaches the trap door and remains in that position while the arm started to execute a series of movements to reach A fully horizontal position as shown in FIG. 5. Next, the USPGV tray 6 starts to move towards the pig while the arm is fully extended. Next, once the tip of the arm reaches the pig trap tail, the tray 6 starts to move pushing the pig towards the inside of the trap. Next, the pig reaches its final position by the action of the hydraulic piston 30 which positions the pig at the desired location inside the trap. The pig sensors 28 mounted on the trap send the pig arrival signal to the local controller 47 which in turn retransmits the signal to the USPGV controller 20 indicating that the pig reached the final position and it is ready for launching. This last action makes the controller to send a stop command to the hydraulic piston and initiate arm retrieval by moving the tray 6 backward and re-establishing the arm initial conditions.

Figure 14:
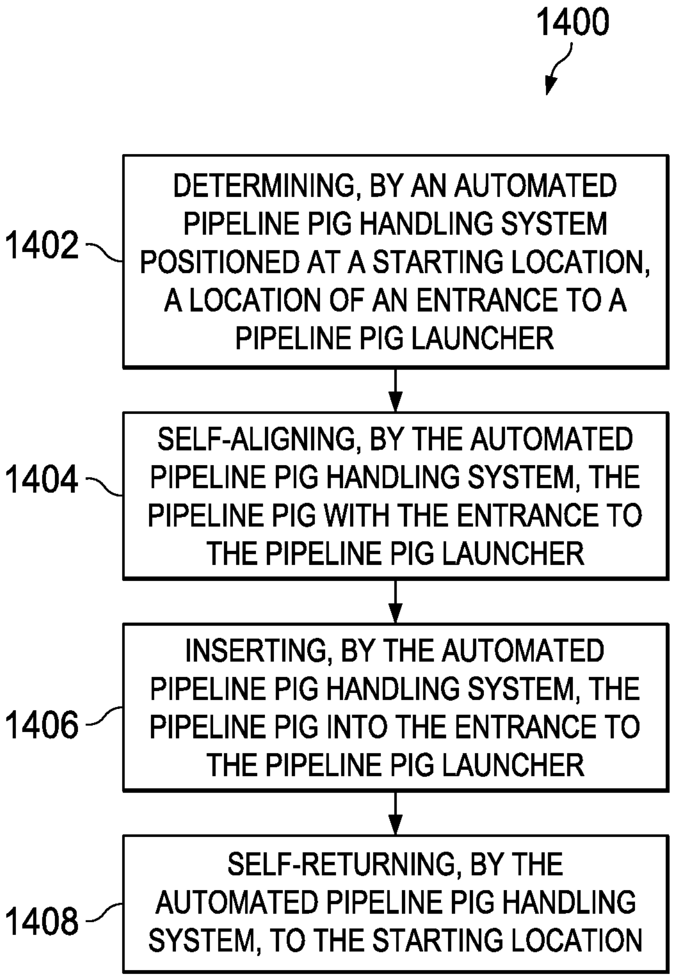
FIG. 14 shows a flowchart of an example method to utilize an automatic pipeline handling system.

The implementations mentioned within this disclosure can be utilized with method 1400 shown in FIG. 14. At 1402, a location of an entrance to a pipeline pig launcher is determined by an automated pipeline pig handling system positioned at a starting location. At 1404, the pipeline pig is self-aligned with the entrance to the pipeline pig launcher by the automated pipeline pig handling system. At 1406, the pipeline pig is inserted into the entrance to the pipeline pig launcher by the automated pipeline pig handling system. At 1408, the automated pipeline pig handling system self-returns to the starting location.

Figure 15:
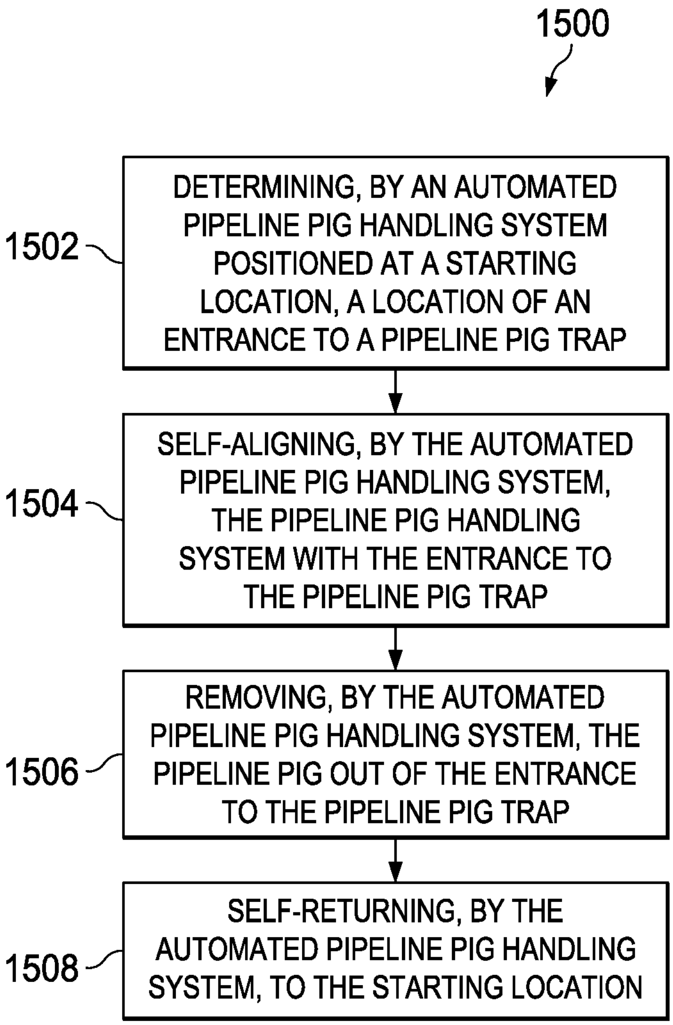
FIG. 15 shows a flowchart of an alternative example method to utilize an automatic pipeline handling system.

The implementations mentioned within this disclosure can also be utilized with alternative method 1500 shown in FIG. 15. At 1502, a location of an entrance to a pipeline pig trap is determined by an automated pipeline pig handling system positioned at a starting location. At 1504, the automated pipeline pig handling system is self-aligned with the entrance to the pipeline pig launcher by the automated pipeline pig handling system. At 1506, the pipeline pig is removed out of the entrance to the pipeline pig trap by the automated pipeline pig handling system. At 1508, the automated pipeline pig handling system self-returns to the starting location.

A number of implementations of the invention have been described. Nevertheless, it will be understood that various modifications may be made without departing from the spirit and scope of the invention. For example, the USPGV could be configured to work with a vertical pig launcher or a vertical pig trap. Accordingly, other implementations are within the scope of the following claims.

The invention claimed is:

1. A method of handling a pipeline pig, the method comprising:

determining, by an automated pipeline pig handling system positioned at a starting location, a location of an entrance to a pipeline pig launcher configured to launch a pipeline pig into a pipeline, wherein the entrance to the pipeline pig launcher is open, wherein the automated pipeline handling system comprises:

an outer body, and an articulated arm attached to the outer body, the articulated arm configured to connect to the pipeline pig;

self-aligning, by the automated pipeline pig handling system, the pipeline pig with the entrance to the pipeline pig launcher;

inserting, by the automated pipeline pig handling system, the pipeline pig into the entrance to the pipeline pig launcher, wherein the entrance to the pipeline pig launcher is closed after the pipeline pig is inserted into the entrance by the automated pipeline pig handling system;

self-returning, by the automated pipeline pig handling system, to the starting location after inserting the pipeline pig into the entrance to the pipeline pig launcher;

operating, by the automated pipeline pig handling system, the articulated arm to lift the pipeline pig; and operating, by the automated pipeline pig handling system, the articulated arm to place the pipeline pig on the outer body.

2. The method of claim 1, wherein the automated pipeline handling system comprises:

a transportation assembly attached to the outer body, the transportation assembly configured to receive the pipeline pig and to move the pipeline pig to one or more of a plurality of locations on the transportation assembly, a plurality of sensors, at least one of the sensors attached to the outer body, the plurality of sensors configured to sense parameters associated with a location of the outer body relative to the pipeline pig launcher; and a controller comprising processing circuitry, the controller connected to the articulated arm, the transportation assembly and the plurality of sensors, the controller configured to perform pipeline pig launching or retrieval operations by controlling the articulated arm and the transportation assembly based on the parameters sensed by the plurality of sensors, wherein operating the articulated arm to lift the pipeline pig and operating the articulated arm to place the pipeline pig on the outer body comprises:

receiving, by the automated pipeline pig handling system, first sensor information from the plurality of sensors, the first sensor information identifying the starting location of the pipeline pig relative to the location of the outer body;

adjusting, by the automated pipeline pig handling system, a position of the articulated arm to attach to the pipeline pig based on identifying the starting location of the pipeline pig relative to the location of the outer body;

moving, by the automated pipeline pig handling system, the articulated arm to the starting location of the pipeline pig; and attaching, by the automated pipeline pig handling system, the articulated arm to the pipeline pig.

3. The method of claim 2, wherein the entrance to the pipeline pig has a first longitudinal axis, wherein the outer body has a second longitudinal axis, wherein self-aligning the pipeline pig with the entrance to the pipeline pig launcher comprises self-aligning the second longitudinal axis with the first longitudinal axis.

4. The method of claim 3, wherein self-aligning the second longitudinal axis with the first longitudinal axis comprises:

receiving, by the automated pipeline pig handling system, second sensor information from the plurality of sensors, the second sensor information identifying a location of the first longitudinal axis of the entrance to the pipeline pig launcher relative to a location of the second longitudinal axis of the outer body; and operating, by the automated pipeline pig handling system, the transportation assembly to move the outer body and align the second longitudinal axis with the first longitudinal axis.

5. The method of claim 4, wherein the automated pipeline pig handling system comprises at least one of a scissors lift or outriggers, wherein self-aligning the second longitudinal axis with the first longitudinal axis comprises:

operating, by the automated pipeline pig handling system, the scissors lift or the outriggers to increase an elevation of the pipeline pig from a ground and to align the second longitudinal axis with the first longitudinal axis.

6. The method of claim 1, wherein the articulated arm is extendable from a retracted state to an extended state, and wherein inserting, by the automated pipeline pig handling system, the pipeline pig into the entrance to the pipeline pig launcher comprises:

operating, by the automated pipeline pig handling system, to extend the articulated arm to which the pipeline pig is attached from the retracted state to the extended state, wherein, in the extended state, the articulated arm extends into the entrance to the pipeline pig launcher.

7. The method of claim 1, wherein the articulated arm comprises a telescoping piston, and wherein inserting, by the automated pipeline pig handling system, the pipeline pig into the entrance to the pipeline pig launcher comprises:

operating, by the automated pipeline pig handling system, the articulated arm to which the pipeline pig is attached to extend the telescoping piston, wherein an extended telescoping piston extends into the entrance to the pipeline pig launcher.

8. A method of handling a pipeline pig, the method comprising:

determining, by an automated pipeline pig handling system positioned at a starting location, a location of an entrance to a pipeline pig trap configured to receive a pipeline pig from a pipeline, wherein the entrance to the pipeline pig trap is open, wherein the automated pipeline pig handling system comprises:

an outer body, and an articulated arm attached to the outer body, the articulated arm configured to connect to the pipeline pig;

self-aligning, by the automated pipeline pig handling system, the automated pipeline pig handling system with the entrance to the pipeline pig trap;

removing, by the automated pipeline pig handling system, the pipeline pig out of the entrance to the pipeline pig trap, wherein the entrance to the pipeline pig trap is closed after the pipeline pig is removed out of the entrance by the automated pipeline pig handling system;

self-returning, by the automated pipeline pig handling system, to the starting location after removing the pipeline pig from the entrance to the pipeline pig trap, operating, by the automated pipeline pig handling system, the articulated arm to lift the pipeline pig; and operating, by the automated pipeline pig handling system, the articulated arm to place the pipeline pig on the outer body.

9. The method of claim 8, wherein the automated pipeline handling system comprises:

a transportation assembly attached to the outer body, the transportation assembly configured to receive the pipeline pig and to move the pipeline pig to one or more of a plurality of locations on the transportation assembly, a plurality of sensors, at least one of the sensors attached to the outer body, the plurality of sensors configured to sense parameters associated with a location of the outer body relative to the pipeline pig launcher; and a controller comprising processing circuitry, the controller connected to the articulated arm, the transportation assembly and the plurality of sensors, the controller configured to perform pipeline pig launching or retrieval operations by controlling the articulated arm and the transportation assembly based on the parameters sensed by the plurality of sensors, wherein operating the articulated arm to lift the pipeline pig and operating the articulated arm to place the pipeline pig on the outer body comprises:

receiving, by the automated pipeline pig handling system, first sensor information from the plurality of sensors, the first sensor information identifying the starting location of the pipeline pig relative to the location of the outer body;

adjusting, by the automated pipeline pig handling system, a position of the articulated arm to attach to the pipeline pig based on identifying a starting location of the pipeline pig relative to the location of the outer body;

moving, by the automated pipeline pig handling system, the articulated arm to the starting location of the pipeline pig; and attaching, by the automated pipeline pig handling system, the articulated arm to the pipeline pig.

10. The method of claim 8, wherein the articulated arm is retractable from an extended state to an retracted state, and wherein removing, by the automated pipeline pig handling system, the pipeline pig from the entrance to the pipeline pig trap comprises:

operating, by the automated pipeline pig handling system, to retract the articulated arm to which the pipeline pig is attached from the extended state to the retracted state, wherein, in the retracted state, the articulated arm retracts out of the entrance to the pipeline pig trap.

11. The method of claim 8, wherein the articulated arm comprises a telescoping piston, and wherein removing, by the automated pipeline pig handling system, the pipeline pig out of the entrance to the pipeline pig trap comprises:

operating, by the automated pipeline pig handling system, the articulated arm to which the pipeline pig is attached to retract the telescoping piston, wherein a retracted telescoping piston retracts out of the entrance to the pipeline pig trap.

* * * * *

UNITED STATES PATENT AND TRADEMARK OFFICE

CERTIFICATE OF CORRECTION

PATENT NO. : 10,955,082 B2
APPLICATION NO. : 16/440142
DATED : March 23, 2021
INVENTOR(S) : Pablo Daniel Genta It is certified that error appears in the above-identified patent and that said Letters Patent is hereby corrected as shown below:

In the Claims

Column 18
Claim 8, Line 45, delete “trap,” and insert -- trap; --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*